(12) United States Patent
Gao et al.

(10) Patent No.: US 12,449,902 B2
(45) Date of Patent: Oct. 21, 2025

(54) 3D-PRINTED EPIDERMAL WEARABLE MICROFLUIDIC ELECTRONIC SKIN FOR MACHINE LEARNING-POWERED MULTIMODAL HEALTH SURVEILLANCE

(71) Applicant: CALIFORNIA INSTITUTE OF TECHNOLOGY, Pasadena, CA (US)

(72) Inventors: Wei Gao, Pasadena, CA (US); Yu Song, Pasadena, CA (US); Roland Yingjie Tay, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 18/815,534

(22) Filed: Aug. 26, 2024

(65) Prior Publication Data
US 2025/0068241 A1    Feb. 27, 2025

Related U.S. Application Data

(60) Provisional application No. 63/534,774, filed on Aug. 25, 2023.

(51) Int. Cl.
*G06F 3/01* (2006.01)
*B29C 48/00* (2019.01)
*B33Y 80/00* (2015.01)
*G06F 1/16* (2006.01)

(52) U.S. Cl.
CPC ............ *G06F 3/015* (2013.01); *B29C 48/022* (2019.02); *B33Y 80/00* (2014.12); *G06F 1/163* (2013.01)

(58) Field of Classification Search
CPC ........ G06F 3/015; B33Y 80/00; B29C 48/022

USPC ......................................................... 345/156
See application file for complete search history.

(56) References Cited

U.S. PATENT DOCUMENTS

2023/0088449 A1* 3/2023 Verma ................ A61B 5/14517
                                                              600/346
2023/0270372 A1* 8/2023 Rogers ..................... F24F 11/63
                                                              700/276

FOREIGN PATENT DOCUMENTS

WO        2022/229931 A1    11/2022

OTHER PUBLICATIONS

PCT International Search Report and the Written Opinion mailed Dec. 19, 2024, issued in related International Application No. PCT/US2024/043916 (13 pages).
Taeil Kim et al., "A 3D Printed Wearable Bioelectronic Patch for Multi-Sensing and In Situ Sweat Electrolyte Monitoring", Advanced Materials Technologies, vol. 6, No. 4, Jan. 14, 2021, p. 1-11.

(Continued)

*Primary Examiner* — Calvin C Ma
(74) *Attorney, Agent, or Firm* — Sheppard Mullin Richter & Hampton LLP

(57) ABSTRACT

Systems and methods for a wearable system that monitors various biomarkers with a 3D-printed wearable electronic skin. Specifically, the wearable system is a 3D-printed epidermal wearable microfluidic electronic skin that may be composed of a combination of multidimensional nanomaterials, polymers, and hydrogels. The epidermal wearable microfluidic electronic skin may be integrated with sensors, electrodes, microfluidics, and a processor to collect and analyze molecular biomarkers of biofluid samples on the user's skin, while simultaneously analyzing the user's physiological biomarkers to conduct a health status assessment or gather health monitoring/surveillance metric.

20 Claims, 18 Drawing Sheets

(56) References Cited

OTHER PUBLICATIONS

Wubin Bai et al., "Patchable micro/nanodevices interacting with skin", Biosensors and Bioelectronics, Elsevier Science Ltd., UK, Amsterdam, NL, vol. 122, Sep. 11, 2018, pp. 189-204.
Sam Emaminejad et al., "Autonomous sweat extraction and analysis applied to cystic fibrosis and glucose monitoring using a fully integrated wearable platform", Proceedings of the National Academy of Sciences (PNAS), vol. 114, No. 18, Apr. 17, 2017, pp. 4625-4630.
Hui Chen et al., "Fundamentals, Applications, and Future Directions of Bioelectrocatalysis", Chemical Reviews, vol. 120, No. 23, Dec. 9, 2020, pp. 12903-12993.
Koji Sugioka et al., "Femtosecond laser three-dimensional micro- and nanofabrication", Applied Physics Reviews, vol. 1, No. 4, Dec. 1, 2014, pp. 1-35.
Alexander D. Valentine et al., "Hybrid 3D Printing of Soft Electronics", Advanced Materials, VCH Publishers, DE, vol. 29, No. 40, 1703817, Sep. 6, 2017, pp. 1-8.

* cited by examiner

3D-PRINTED EPIDERMAL WEARABLE MICROFLUIDIC ELECTRONIC SKIN FOR MACHINE LEARNING-POWERED MULTIMODAL HEALTH SURVEILLANCE

RELATED APPLICATION

This application claims the benefit of U.S. Provisional Application No. 63/534,774 filed on Aug. 25, 2023, the contents of which are incorporated herein by reference in their entirety.

This invention was made with government support under Grant No(s). DK132666 & HL155815 awarded by the National Institutes of Health and under Grant No. N00014-21-1-2483 awarded by the Office of Naval Research. The government has certain rights in the invention.

TECHNICAL FIELD

The present disclosure relates generally to three-dimensional printing of wearable multimodal sensor patches for health monitoring. In particular, some implementations may relate to systems and methods for three-dimensional printed epidermal wearable microfluidic electronic skin for machine learning-powered multimodal health surveillance.

BACKGROUND

Wearable technologies have experienced a substantial evolution over the past decades, transitioning from simple mechanical devices to sophisticated systems capable of performing a wide range of health monitoring functions. Initially, wearable technologies were largely limited to basic applications, such as tracking physical activity and monitoring heart rate. These early devices laid the groundwork for what has become a burgeoning interest in developing technology for personal health monitoring and surveillance. As the potential for wearable devices expanded, so did the ambition to incorporate more complex sensing capabilities, for example, physiochemical sensing or biophysical sensing. These advanced functionalities aim to provide a more comprehensive view of an individual's health by monitoring a variety of physiological signals and signs in real- or near-real-time.

However, the development and widespread adoption of these advanced wearable technologies has been hampered by significant challenges. One of the primary obstacles is that these advanced wearable systems require sophisticated technology to achieve such complex sensing capabilities. This technology often involves intricate designs and the use of expensive materials, making the devices time intensive, labor intensive, and costly to produce. The reliance on sophisticated components and sensors not only increases the initial production costs but also complicates the manufacturing process, leading to slower fabrication times. This slow, costly production process poses a substantial barrier to the widespread adoption of advanced wearable health monitoring devices, particularly for personal or at-home use where cost and accessibility are crucial considerations.

Moreover, the complexity of these devices often results in increased power consumption, which can limit their practicality for continuous, long-term monitoring. The need for frequent recharging or battery replacement undermines the convenience and user-friendliness of wearable technologies, further detracting from their appeal to the general public. Additionally, the durability and wearability of these devices can be compromised by their complex designs. Ensuring that advanced wearable devices are comfortable to wear and robust enough to withstand daily activities remains a considerable challenge, further complicating their development and adoption.

These challenges highlight the need for innovative approaches to the design and manufacturing of wearable technologies. Solutions that can reduce costs, simplify production processes, and improve the practicality of these devices are essential for advancing the field of wearable health monitoring. As the demand for more sophisticated health monitoring grows, efficiently and affordably produced advanced wearable technologies will become crucial. This advancement is essential for meeting this demand and realizing the potential of real-time or near-real-time health surveillance.

SUMMARY

The amalgamation of wearable technologies with physiochemical sensing capabilities may create powerful interpretive and predictive platforms for real-time, or near-real-time, health surveillance and monitoring. However, the construction of such multimodal devices is difficult to be implemented by traditional manufacturing techniques for at-home personalized applications. Various embodiments of the present disclosure discuss a more universal semi-solid extrusion-based three dimensional (3D) printing technology to fabricate an epidermal wearable microfluidic elastic electronic skin ($e^3$-skin) with high-performance multimodal physiochemical sensing capabilities. The $e^3$-skin can serve as a sustainable surveillance platform to capture the real-time or near-real-time physiological state of individuals during regular or particularized daily activities. By coupling the information collected from the $e^3$-skin with machine learning, predictions may be made relating to an individual's degree of behavior impairments (i.e., reaction time and inhibitory control) after alcohol consumption, stress levels from both physical and cognitive stress, health status, and similar monitored human characteristics. Embodiments disclosed herein may allow for future autonomous manufacturing of customizable wearable systems which may enable widespread utility for regular health monitoring and clinical applications.

Embodiments described herein relate to a wearable system including a 3D-printed epidermal wearable microfluidic electronic skin, which may adhere to and conform with the contours of human skin. The wearable system may include an array of 3D-printed sensors. In such embodiments, at least one of the sensors may be constructed with semi-solid extrusion (SSE)-based 3D-printing technology. Additionally, at least one of the sensors may be constructed using direct ink writing (DIW), and at least one sensor may be constructed using selective phase elimination. In other embodiments, more than one sensor may be constructed using DIW and/or selective phase elimination. Further, at least one of the sensors may be printed with customizable ink. The customizable ink may be selected from, or based on, various ink formulations as described throughout.

In embodiments, the wearable system's array of 3D-printed sensors may include at least one electrochemical sweat biosensor. It may also include at least one biophysical sensor in the array of 3D-printed sensors. The wearable system may also be equipped with a 3D-printed processor including non-transitory computer-readable instructions that may process collected data from the array of 3D-printed sensors.

Various embodiments of the wearable system may further include at least two 3D-printed electrodes, which may be integrated within the 3D-printed skin. In such embodiments, at least one of the at least two electrodes may be constructed with semi-solid extrusion (SSE)-based 3D-printing technology. Additionally, at least one of the at least two electrodes of the sensors may be constructed using direct ink writing (DIW), and at least one of the at least two electrodes may be constructed using selective phase elimination. Further, at least one of the at least two electrodes may be printed in customizable ink. In other embodiments, both or all electrodes may be printed with a customizable ink and in accordance with the principles described herein. These electrodes may be configured for localized sweat induction. In such embodiments, the wearable system's electrodes may include at least two hydrogel-coated iontophoresis electrodes.

Various embodiments of the wearable system may include 3D-printed microfluidics components, which further include multiple inlets. These inlets may be configured to contact the skin and collect a sweat sample from the skin. Further, the inlets may be printed with customizable ink. In embodiments, the microfluidics component may be constructed using semi-solid extrusion (SSE)-based 3D-printing technology. Additionally, embodiments may be constructed using direct ink writing (DIW), and embodiments may be constructed using selective phase elimination.

In embodiments, the wearable system may include a micro-supercapacitor (MSC), which may be configured to store energy. In such embodiments, the MSC may be coupled with an energy harvesting device.

Various embodiments may also include a method of manufacturing an electronic skin. The method may include combining a 3D-printed microfluidics layer, a 3D-printed biosensor, and a 3D-printed micro-supercapacitor. The method may include 3D-printing microfluidics layers where the layers may be made from a first, second, third, fourth, and up to nth, customizable ink: the layers including, a 3D-printed SBS inlet layer, a 3D-printed SBS channel layer, and a 3D-printed carbachol-loaded hydrogel (carbagel) layer. Such a method may utilize semi-solid extrusion (SSE)-based 3D-printing. Additionally, it may also use direct ink writing (DIW). Finally, such embodiments may use selective phase elimination.

The method may also include 3D-printing biosensors. Embodiments of the method may include using an nth customizable ink, 3D-printed SBS substrate, a 3D-printed electrode, and a 3D-printed sensing layer. In such a method, the 3D-printed electrode may be a 3D-printed MXene electrode, a 3D-printed Ag electrode, or a 3D-printed CNT-SBS electrode. Such method may also include 3D-printing using CNT-SBS-PANI. Such a method may also utilize semi-solid extrusion (SSE)-based 3D-printing. Additionally, it may also use direct ink writing (DIW). Finally, such embodiments may use selective phase elimination.

Embodiments of the method may also include 3D-printing a micro-supercapacitor layer. A method of configuring this layer may use an nth customizable ink, a 3D-printed substrate, a 3D-printed MXene electrode, and a 3D-printed gel electrolyte. Such a method may also utilize semi-solid extrusion (SSE)-based 3D-printing. Additionally, it may also use direct ink writing (DIW). Finally, embodiments may use selective phase elimination.

In embodiments, the formula of the various customizable inks used in this method may include at least one of the following compounds: MXene, CNT-PDMS, Ag, CNT-SBS, CNT-SBS-PANI, SBS, MX-PB, carbachol-loaded hydrogel (carbagel), PVA-$H_2SO_4$, $GO_x$, PU, PEG, BSA, chitosan, carbachol, PVA, UA, D-glucose, NaCl, DMF, KCl, PBS, LiF, $Fe_4[Fe(CN)_6]_3$, $FeCl_3$, THF, $K_3Fe(CN)_6$, HCl, CNT, CB, PDMS, and $AO_x$.

The embodiments described here relate to an electronic skin system for health status surveillance. In such embodiments, the electronic skin system may include 3D-printed epidermal wearable microfluidic electronic skin which may be configured to conform with the contours of skin. The 3D-printed epidermal wearable microfluidic electronic skin may comprise of first customizable ink. In further embodiments the electronic skin systems may include an array of 3D-printed sensors integrated with the 3D-printed skin system. The array of 3D-printed sensors may be comprised of a second customizable ink.

In embodiments, the electronic skin system may include at least two 3D-printed electrodes comprised of a customizable ink. Such electrodes may be integrated with the 3D-printed epidermal wearable microfluidic electronic skin and configured for localized skin induction.

In further embodiments, the electronic skin system may include a microfluidic component made up of multiple inlets and be fabricated via a fourth (or nth+1) customizable ink. Such inlets may contact the skin and collect sweat samples.

In further embodiments, the electronic skin system may include a 3D-printed processor comprising non-transitory computer readable instructions. This instruction may be use to process data collected from the array of 3D-printed sensors. Such embodiments may use a fifth (or nth+1) customizable ink for the 3D-printed processor.

In such embodiments, the first, second, third, fourth, and fifth customizable inks (as well as any additional customizable inks) may be different from each other and compose at least one of the following compounds: MXene, CNT-PDMS, Ag, CNT-SBS, CNT-SBS-PANI, SBS, MX-PB, carbagel, PVA-$H_2SO_4$, $GO_x$, PU, PEG, BSA, chitosan, carbachol, PVA, UA, D-glucose, NaCl, DMF, KCl, PBS, LiF, $Fe_4[Fe(CN)_6]_3$, $FeCl_3$, THF, $K_3Fe(CN)_6$, HCl, CNT, CB, PDMS, and $AO_x$.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
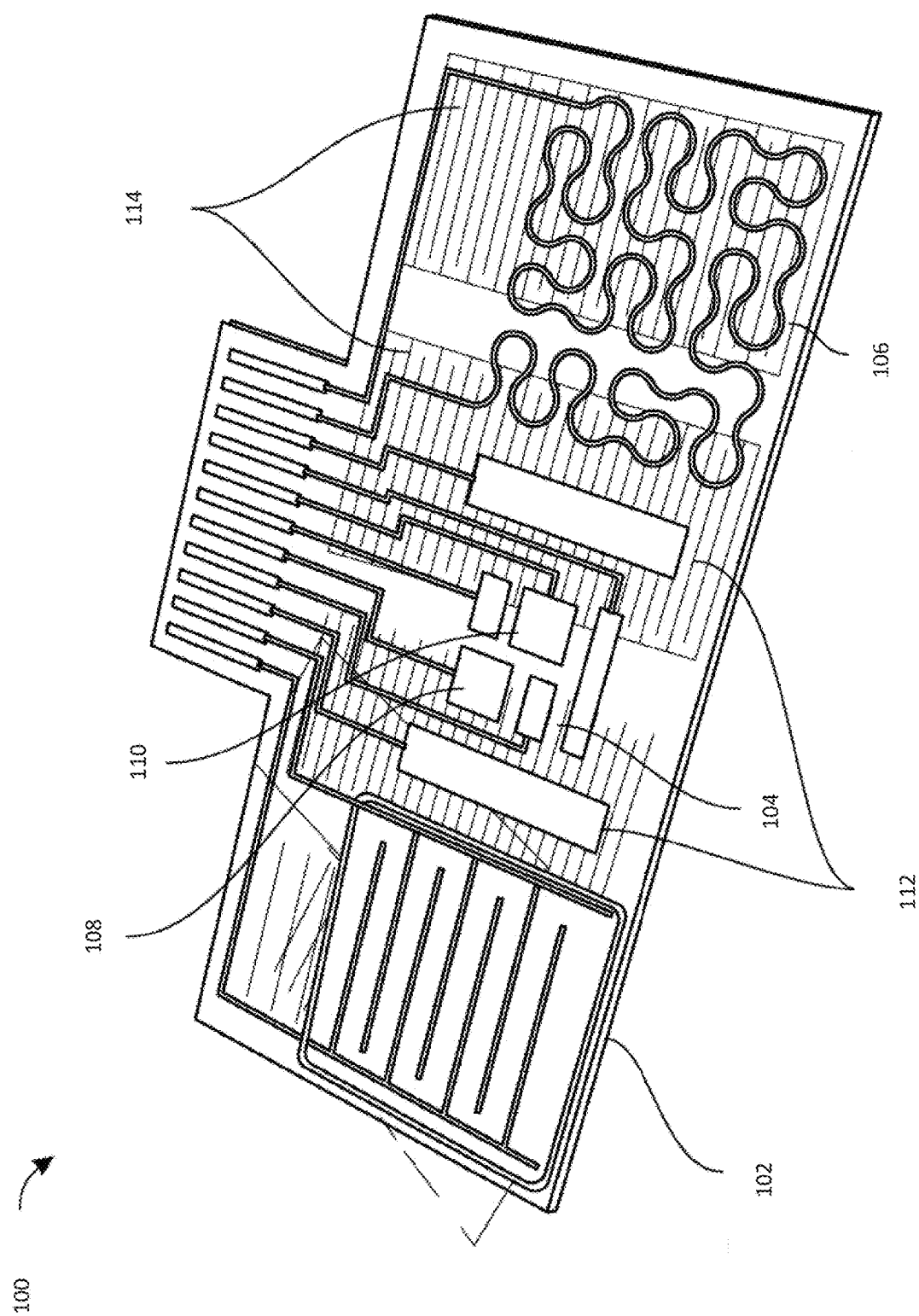
FIGS. 1A-1B are example diagrams showing a wearable system, in accordance with various embodiments of the disclosed technology.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Monitoring and effectively recognizing pre-medical symptoms to obtain early intervention is paramount in sustaining patients' physical well-being and increasing longevity. With the advent of wearable technology, traditional healthcare practices are rapidly changing their course through the implementation of personalized medicine and digital health. Skin-interfaced wearable devices that deliver intimate details relating to users' health status in real-time or near-real-time may be integral enablers to this endeavor. Real-time or near-real-time tracking of vital signs such as heart rate and body temperature from the skin may provide insightful information on the physiological condition of the human body. Additionally, in situ microfluidic sampling and analysis of sweat, a key non-invasively accessible body fluid, could offer rich bio-molecular information closely associated with a user's health state. To this end, there is an unprecedented need to develop multimodal wearable systems with both molecular sensing and vital sign tracking capabilities for more comprehensive information of a user's bodily responses. Such multimodal data, when coupled with modern data analysis approaches (including machine learning), may enable numerous practical health surveillance and clinical applications.

Despite the high demand for wearable systems, fabrication and integration of transdisciplinary modules for such wearable devices often involve processes that employ highly customizable materials and designs. For example, patterned nanomaterials and composites are typically utilized to increase active surface area of electrochemical sweat sensors for enhanced sensing capabilities. Similarly, employment of various biorecognition molecules (e.g., enzymes and ionophores) in a polymer matrix may often be necessary for selective detection of specific biomarkers (e.g., metabolites and ions). Polymeric hydrogels are commonly patterned on electrodes for transdermal delivery of nicotinic agents (e.g., pilocarpine, carbochol) via iontophoresis for autonomous sweat induction while microfluidic channels that regulate and sample the sweat flow are typically fabricated through polymer molding or laser cutting of plastic films. Conversely, 3D micro-nanostructures with compressible and stretchable functionalities are often required for highly sensitive pressure and strain sensing. Hence, the incorporation of such complex fabrication, which encompasses a diverse range of materials and processes, traditionally requires the combination of a series of conventional cleanroom facilities and manufacturing technologies. Moreover, complementary laborious interventions such as manual deposition and assembly, are usually performed at a laboratory scale. The development of a scalable and customizable prototyping and fabrication method that caters to the aforementioned fabrication needs would be vital for the future widespread implementation of multimodal wearable sensors in personalized healthcare, but previously had not been realized.

To address these challenges, various embodiments of the present disclosure include an epidermal wearable microfluidic elastic/flexible electronic skin ($e^3$-skin) with multimodal physiochemical sensing capabilities, which may be constructed using a highly adaptable and versatile semi-solid extrusion (SSE)-based 3D-printing technology involving direct ink writing (DIW) and selective phase elimination. Embodiments of the 3D-printed $e^3$-skin, coupled with machine learning methods, may enable remote multimodal personalized health assessments, vital sign and health monitoring, and general health surveillance. Embodiments of the present disclosure may be described with reference to the $e^3$-skin and to a wearable device, as claimed. These descriptions aim to assist the reader in understanding the manufacture, fabrication, utility, and use of the $e^3$-skin, which, herein, may be interchangeably described as a wearable system or device.

To prepare the $e^3$-skin to optimize performance for on-body biosensing, epidermal microfluidic modulation, and energy conservation/efficiency, functional inks comprising various multidimensional nanomaterials, polymers, and hydrogels may be custom-tailored to pattern some or all multi-dimensional architectures in the wearable system. Inks may be formulated to fulfill the desired rheological properties for SSE, which may necessitate suitable viscoelasticity and shear-thinning behaviors as instructed by the choice of materials. A phase elimination strategy, which may involve the selective removal of a sacrificial component in the ink, may be employed to transform as printed 3D filaments into porous architectures to enhance the performance. This technology may enable low-cost customizable prototyping of sustainable and wearable multifunctional physiochemical sensing systems via a simple process, suitable for remote healthcare surveillance.

The SSE-based 3D-printed $e^3$-skin may include an array of electrochemical sweat biosensors (e.g., glucose, alcohol, and pH sensors) and biophysical sensors (e.g., temperature and pulse sensors), a pair of hydrogel-coated iontophoresis electrodes for localized sweat induction, microfluidics for efficient sweat sampling, and a micro-supercapacitor (MSC) as an energy storage module interfaced with an energy harvesting device (e.g., solar cell) for sustainable wearable operation. Further integrated with a wireless electronic module, embodiments of the $e^3$-skin could perform prolonged physiochemical data collection from daily activities of the user. Such multimodal data collection, coupled with machine-learning-based data analytics, may permit further personalized healthcare applications that are especially pertinent in the era of digital health. For example, embodiments of the $e^3$-skin may simultaneously monitor the pulse waveform, temperature, and alcohol levels using a machine-learning-coupled $e^3$-skin, such that embodiments may be able to accurately predict an individual's behavior response.

Further embodiments of the present disclosure may include a wearable system that may monitor up to, or more than, six key molecular biomarkers (e.g., glucose, lactate, UA, $Na^+$, $K^+$, and $NH_4^+$) and up to, or more than, three key physiological biomarkers (e.g., pulse, GSR, skin temperature). These biomarkers may be used to determine a stress response or health status. However, other biomarkers may also be utilized based on their individual or combined association with stress responses or other monitored health statuses.

Turning now to the wearable system (also described as the $e^3$-skin throughout). The wearable assessment system may include various 3D-printed sensors or biosensors, including, for example, enzymatic biosensors, ion selection sensors (ISEs), and physiological biosensors or indicators. Molecular biosensors (e.g., enzymatic biosensors, ISEs, metabolic biosensors, electrolyte biosensors, etc.) may be configured to detect a wide variety of organic compounds present in a sweat sample, such as metabolites, electrolytes, amino acids, vitamins, minerals, hormones, antibodies, and other compounds that may be present in a sweat sample (at minimally sufficient levels where biosensors may detect concentrations of each compound). Generally, biosensors may include enzymatic sensors, ISEs, tissue-based sensors, antibody sensors, DNA sensors, optical sensors, capacitive pulse sensors, electrochemical biosensors, GSR sensors, temperature sensors, piezoelectric sensors, and/or similar biosensors.

Various embodiments may include a 3D-printed epidermal wearable microfluidic skin configured to adhere to and conform with the contours of human skin. The 3D-printed epidermal wearable microfluidic skin may allow for robust long-term sensing capabilities for health status monitoring or general health surveillance. The epidermal wearable microfluidic skin may be fabricated using a scalable 3D-printing approach, the wearable assessment system may be capable of multiplexed, non-invasive monitoring of health status-related physiological signals (e.g., pulse waveform, GSR, skin temperature, etc.), sweat metabolites (e.g., glucose, lactate, UA, etc.) and electrolytes (e.g., $NA^+$, $K^+$, $NH_4^+$, etc.) during daily activities and/or over long periods of continuous or near-continuous use. Through the integration of a miniaturized iontophoresis (IP) module into the wearable system (and/or in a microfluidic sweat sampling component), sweat can be induced autonomously at rest without the need for vigorous exercise.

To realize the practical molecular biomarker monitoring through the microfluidics component without the need for vigorous exercise, miniaturized 3D-printed electrodes coated with carbochol-hydrogels (carbagel) may be incorporated into the wearable system for autonomous local sweat induction. Sweat can be continuously secreted from the surrounding glands over a prolonged period of time because of the nicotinic effects of carbachol (for example, transdermally delivered for approximately 5 minutes by means of an approximately 50 microamp current). Efficient sampling may be obtained through microfluidics collection for real-time (or near-real-time) bio-analysis with a higher temporal resolution (higher as compared to conventional systems).

Embodiments of the present disclosure may be built on an ultrathin flexible 3D-printed substrate for flexibility and robustness, as well as integrated with 3D-printed microfluidics. The wearable system may conformally laminate on a user's skin (at, for example, a human patient's wrist) for reliable and robust sensing. This may allow for longer periods (e.g., 12-36 hours) of continuous monitoring of daily activities, yielding greater insight into how these signals may vary throughout the day. Embodiments may incorporate machine learning (ML) pipelines or models (discussed below), allowing for previously inaccessible multimodal data to be incorporated into the stress assessments. In other words, the physicochemical sensor data obtained by the wearable system can be used to classify/identify health status indicators and/or monitor health status with higher reliability and accuracy.

Embodiments of the wearable system may include a 3D-printed array of sensors, where such array of sensors may be multiple layers and/or include multiple different sensor types. The array of sensors may include biosensors (e.g., three enzymatic biosensors), various ion-selective sensors (ISEs) (e.g., three ISEs), a capacitive pulse sensor, a resistive GSR sensor, and/or a skin temperature sensor. Further embodiments may include other types of biosensors specifically chosen for their application to particular health metrics or monitored indicators. Other embodiments of the wearable system may include more sensors, while further embodiments may include fewer sensors.

Embodiments of the wearable system may include a metabolite detection logical circuit, an electrolyte detection logical circuit, and/or a physiological indicator logical circuit. Said logical circuits may include the biosensors used to measure the concentrations of the relevant biomarkers (or monitor vital signs) and output information representative of said biomarkers in a machine-readable format (e.g., biomarker data). The output of said circuits may be readable by a processor or smart device as described below.

Embodiments of the wearable system may also include a 3D-printed microfluidics components for biofluid extraction, sampling, and multiplexed analysis. To enable on-demand and continuous molecular monitoring, a miniaturized microfluidics component with a built-in iontophoretic sweat induction module composed of hydrogels containing carbachol-hydrogel (carbagel) and iontophoresis electrodes (IP cathode and IP anode), may be included on the $e^3$-skin to interface with the 3D-printed biochemical sensors. See, e.g., FIG. 1B. Autonomous and long-lasting sweat induction may be initiated via transdermal delivery of muscarinic agent carbagel. See, e.g., FIG. 5D. The sweat-sampling microfluidics component may be 3D-printed using an SBS ink with an appropriate viscosity to achieve high printing resolution, while the iontophoresis module may be prepared by printing a pair of CNT-SBS electrodes followed by gelatin-agarose carbagels. Localized sweat induction using the 3D-printed iontophoresis module may occur by delivering a small dose of carbagel with a current to the skin of a patient. The secreted sweat volume may be linearly correlated with the applied current. During on-body usage, the induced sweat may be sampled through inlets on the microfluidics component to ensure that newly secreted sweat flows through the sensing reservoir with high-temporal resolution toward real-time wearable analysis.

Embodiments of the wearable system may further include a 3D-printed processor with machine-readable instruction embedded therein. The machine-readable instructions may cause the one or more processors to analyze the sensor data (detected via the array of 3D-printed sensors). The machine-readable instructions may further cause the processor to display an assessment of the human patient's health status (who is wearing the wearable system) on a graphical user interface. The processor, as discussed below, may be in wired communication with the wearable system or in wireless communication with the wearable system.

Embodiments of the wearable system may further include wearable energy systems. Wearable systems with miniaturized energy harvesting and storage devices are highly desired to promote sustainability and untethered, battery-free operations. Embodiments of the present disclosure may include high-performance 3D-printed MXene MSCs that can interface with a solar cell to power the $e^3$-skin. See, e.g., FIG. 7. A highly concentrated MXene ink may be used to print the freestanding interdigital MSC. The resistance and thickness can be readily tuned by adjusting the number of printed layers and by subjecting them to different post treatments (e.g., air-drying (AD) and freeze-drying (FD)). Compared to AD post treatment, the FD MX-H may exhibit improved electrochemical performance due to the highly porous structures with enhanced active surface area and reduced impedance. Using this approach, a variety of complex 3D architectures can also be stably printed and well-preserved.

The charge-storage performance of the MXene MSC may be utilized after printing a layer of poly(vinyl alcohol) (PVA)-sulfuric acid ($H_2SO_4$) gel electrolyte on top of the interdigital MXene electrodes. Such gel electrolyte may be used in various wearable energy devices. Here, the encapsulated gel electrolyte may exhibit higher biocompatibility and may be assembled without direct contact to the skin, which can help avoid potential irritation. For the detailed investment of FD-H MXene MSC, the electrochemical performance and ion transport property may be further improved with the increased electrode dimensions (number of interdigital pairs, length, and number of printed layers) and the reduced electrode gaps. The CV curves and galvanostatic charge-discharge (GCD) profiles of the FD MSCs may enable an electric double-layer capacitive and high-rate behavior. In particular, MSC with, for example, 10 printed layers (MSC-10L) may exhibit a high areal capacitance and may be able to discharge at a current that is adequate for practical wearable applications and for initiating wireless Bluetooth communications. To achieve desired working potential and capacitance, the 3D-printed MSCs can be serially connected, where a voltage output may be achieved by connecting MSCs in series to potentially power the wearable system with Bluetooth transmission.

To demonstrate the potential of SSE-based 3D-printing technology in the wearable, the disposable 3D-printed $e^3$-skin (consisting of biophysical temperature and pulse sensors, biochemical sensors, iontophoresis-integrated microfluidics, and MSC, as outlined below in relation to FIGS. 1A-1B) may be integrated into a reusable flexible 3D-printed circuit board (FPCB) coupled with a commercial solar cell that may be equipped for energy harvesting, signal processing, and wireless communication. When illuminated, the solar cell may charge the MXene MSCs before initializing the system and may continuously power the wearable device to perform multiplexed electrochemical measurements, signal processing, and data transmission via Bluetooth low energy or other energy systems.

The capability of the $e^3$-skin to perform continuous or near-continuous multimodal sensing offers powerful surveillance and early prediction capabilities to assess an individual's state of health in real-time or near-real-time. Embodiments of the present disclosure may also be used for behavioral response assessment. Consumption of alcohol could substantially influence one's cardiac/metabolic activities as well as cognition and behavior. It is documented that even at low to moderate dosages of alcohol cam impair one's reaction time, coordination, vigilance, judgement, and ability to self-control. Although the delayed behavioral response caused by alcohol intake could have major consequences, measuring alcohol levels alone is often insufficient to determine an individual's behavioral response due to the intrapersonal variations in alcohol tolerance. Alternative approaches such as behavior questionnaires or cognitive tasks could provide more accurate assessment, but are impractical to implement due to the impaired self-awareness after alcohol intake. The present disclosure may allow for real-time collected multimodal data (including both alcohol and vital signs) by the $e^3$-skin from human subjects, which may be coupled with machine learning algorithms, that may be able to more accurately predict an individual's behavioral response, as indicated by their reaction time (RT) and the degree of impairment (DI) for control inhibition.

The present disclosure may monitor various metrics including heart rate and sweat alcohol concentration with increasing dosages of alcohol (via a skin-interfaced alcohol concentration sensor or similar). The machine learning model may weigh certain measurements higher than others, for example, changes in temperature and pH remain subtle indicators of behavioral response to alcohol. In contrast to heart rate, which may increase instantaneously after drinking, sweat alcohol level gradually increase over time, following a similar trend to its blood counterpart. The on-body sweat analysis may be validated by in vivo analysis of the sensor with the blood alcohol content (BAC) measured using a commercial breathalyzer.

To predict the influence of alcohol on an individual's performance, machine learning may be performed to infer the task performance outcomes from the physiological data acquired by the $e^3$-skin. Both the RT and commission error (%) may be found using a ridge regression model. The features of the raw data may be extracted with moving average and a train-test split may be performed to evaluate the model. The regression model may be able to provide a higher-accuracy prediction for both the RT and commission error (%). The importance of each feature in the prediction method, as well as the decision-making process of the machine learning model may be evaluated using Shapley additive explanation (SHAP) values. The results may indicate whether sweat alcohol levels are substantial in predicting the RT and heart rate may be required to supplement sweat alcohol measurements for more accurate prediction of DI.

Furthermore, due to the low-cost and mass-producibility of the wearable system, said system may be disposable after each use: where a use for each system may be up to 48 hours, and where users may easily replace the system without the assistance from a medical professional.

Turning now to the figures. FIGS. 1A-1B are example diagrams showing a wearable system, in accordance with various embodiments of the disclosed technology. FIG. 1A depicts an example diagram showing a wearable system 100 with an array of 3D-printed sensors, including a pressure sensor 102, a pH sensor 104, a temperature sensor 106, a glucose sensor 108, and an alcohol sensor 110. The wearable system 100 may also include sweat stimulation electrodes 112 and a micro-supercapacitor 114. FIG. 1B depicts an example diagram showing the wearable system 100 with a microfluidics component 120-132. The microfluidics component 120-132 may include an inlet 120 that opens or remains open to allow for stimulated sweat to enter the microfluidics component; an anode 122 and cathode 124, used to stimulate sweat production with low voltage current; carbagel 126A, 126B to stimulate sweat production; an outlet 128 for the sweat to leave the microfluidics component after bioanalysis; a reference electrode 130; and a counter electrode 132. The references electrode 130 may be an electrode with a stable and known electrode potential. The counter electrode 132 (which may also be referred to as an auxiliary electrode) may be an electrode used in, for example, a three-electrode electrochemical cell for voltammetric analysis or for other reasons in accordance with the disclosures discussed herein. The wearable system 100 may be fabricated with a base layer of SBS 101, as discussed throughout, and may further include biosensor pins 103 that may allow for the wearable system 100 to be connected or placed in wired or wireless communication with a processor or computing device (not shown).

As discussed, embodiments of the present disclosure may include 3D-printed biophysical sensors (e.g., sensors 102-110 in FIG. 1A). The interconnects and biophysical sensors in the wearable system 100 may be prepared using high-precision SSE with an aqueous $Ti_3C_2T_x$ (MXene) ink (in a process, as depicted in, for example, FIGS. 4B-C, 6A), as well as other combinations of customized inks. Embodiments with MXene ink may include bi-dimensionality with high-aspect-ratio, negatively charged surfaces, and intrinsic hydrophilicity, mono-to few-layer MXene nanosheets feature strong electrostatic repulsion properties, making them highly dispersible and stable in water. The printed linewidth of the MXene filaments can be modulated by tuning the pressure and speed of the extrusion printer. Uniform arrays of intricate lines could reach a minimum linewidth and line gap. The MXene filaments can be readily printed onto a variety of flexible structure, as exemplified by the MXene fingerprints in Raman spectra.

In some embodiments, the wearable system 100 may include various biosensors including a temperature sensor 106. The temperature sensor 106 may measure the skin temperature of a patient in an area adjacent or nearly adjacent to the location of the temperature sensor 106 as configured within the wearable system 100. The temperature sensor 106, for example, may be a 3D-printed resistive temperature sensor 106 integrated into embodiments of the wearable system 100 that may be used to measure skin temperature in situ with sensitivities at approximately 0.115% degrees Celsius$^{-1}$ (+/−0.1%) in physiological temperature ranges between 25 and 50 degrees Celsius. Considering that temperature may have a strong influence on enzymatic activities, the temperature information may be used to calibrate the response of enzymatic biosensors to achieve higher levels of accuracy in situ metabolic analysis. Additionally, environmental factors, such as humidity, have minimal influence on the performance of the chemical sensors, but can be accounted for partially via the temperature sensor 106.

The wearable system 100 may further include a GSR sensor (not shown), for purposes in accordance with the principles discussed herein. Embodiments of the wearable system 100 may use 3D-printed Ag electrodes as the GSR sensor, which may be more conductive than commercial gel electrodes.

In addition to its application as interconnects, MXene may also be used as an active material for wearable temperature sensing. In the wearable system, a MXene-based temperature sensor (e.g., temperature sensor 106) may be patterned by adopting a strain-insensitive serpentine design to withstand the stresses experienced during daily wear. With specific linewidths, the wearable system may exhibit a negative temperature coefficient behavior with a discrete sensitivity across a physiologically relevant range (e.g., 25-50 degrees Celsius). Other printed temperature sensors with different linewidths may exhibit similar sensitivities. Stable temperature sensing performance with fast response time may be observed during mechanical bending tests and upon placing the wearable system on human skin.

The wearable system's pulse monitoring capability may be based on a pressure sensor (e.g., pressure sensor 102) composed of an interdigital MXene electrode and a porous carbon nanotube (CNT)-polydimethylsiloxane (PDMS) foam as the active sensing component. The latter may be prepared via 3D-printing with a customizable ink containing homogeneously mixed PDMS, CNT, and finely ground salt microparticles, followed by selective salt removal to form the porous structure. Certain embodiments may have uniform or average pour sizes, while others may vary. Such porosity may play a role in realizing high pressure sensitivity, and can be optimized by controlling the size of salt microparticles and varying the compositional ratio of CNT-PDMS and salt, to fulfill the rheological criteria for SSE with robust mechanical stability. Although multiple 3D-printed surface architectures (e.g., cone, semi-cylinder, cross-line architectures, etc.) may improve sensitivity, pressure sensors based on a cross-line architecture may prove to yield a higher sensitivity due to increased contact area and further may enable reliable radial pulse monitoring on human subjects. It should be noted that the printed CNT-PDMS foam may be mechanically resilient and superelastic, demonstrating repetitive and reproducible resistance changes under extended pressing-releasing cycles.

The wearable system 100 may include sweat stimulation electrodes, such as anode 122 and cathode 124. There may be sweat stimulation electrodes on either side of the wearable system 100. The sweat stimulation electrodes may each include an iontophoresis cathode and anode. The iontophoresis anode may include carbochol or carbagel that may stimulate sweat production when applied to the skin. In some embodiments, there may only be one sweat stimulation electrode, while in other embodiments there may be more than two sweat stimulation electrodes. The sweat stimulation electrodes may wrap approximately around the outer edge of the wearable system 100, or may be placed internally around or near a central portion of the wearable system 100.

In embodiments, the sweat stimulation electrodes may be controlled by a control module or logical circuit (not shown). The control module may be integrated into the smart device or processor (as discussed below) or may be an independent processing unit. The control module may allow a user to implement electrostimulation using the sweat stimulation electrodes to induce the flow of sweat. The electrostimulation may trigger sweat stimulating agents that may also further trigger the flow of sweat. The sweat stimulating agents may coat the sweat stimulating electrodes. The control module may also allow a user to implement a release of a stimulating agent (e.g., carbagel or similar) to continue inducing sweat flow. The control module may allow a user to set a duration for the induction of sweat over a period of time or at increments in time.

Electrochemical characterizations of the sensors and MSCs may be carried out using an electrochemical workstation. For the characterization of uric acid (UA) sensor, UA solutions may be prepared in PBS and differential pulse voltammetry (DPV) responses may be measured over a potential range with a discrete step potential, pulse period, width, and pulse amplitude. For in vitro characterizations of $H_2O_2$ and enzymatic sensors, solutions of $H_2O_2$, glucose, and alcohol may be prepared in PBS, respectively. Mellvaine's buffers with specific pH values may be used to characterize the pH sensor. In detail, the $H_2O_2$ and enzymatic sensors may be characterized amperometrically at a given potential, and the pH sensor may be characterized using open circuit potential measurement. Both amperometric and potentiometric responses may be set at a sampling interval. Characterization of temperature influence on the sensors may be carried out on a ceramic hot plate.

The performance of the MSCs may be evaluated using cyclic voltammetry (CV) at different scan rates and galvanostatic charge-discharge (GCD) with different currents in a voltage window. The areal capacitance may be calculated using the derived equation based on the CV curve:

$$C_A = \frac{Q}{A \cdot \Delta V} = \frac{1}{k \cdot A \cdot \Delta V} \int_{V_1}^{V_2} I(V)dV \quad (1)$$

For the Ragone plot, the device areal energy density and power density were calculated based on the following equations (where $\Delta t$ is the discharging time, E is the energy density and P is the power density):

$$E = \frac{1}{2 \times 3600} C_A (\Delta V)^2 \quad (2)$$

$$P = \frac{E}{\Delta t} \times 3600 \quad (3)$$

The glucose and alcohol sweat sensors may be validated or calibrated by comparing the measurements in sweat with a commercial blood glucose meter and breathalyzer, respectively.

The electronic system of the $e^3$-skin may include various blocks including: the power management block, which may include an energy harvesting PMIC and a voltage regulator; the data processing and wireless communication block, which may include a compact programmable system-on-chip (PSoC) Bluetooth low energy (BLE) module and a microcontroller (MCU) and BLE radio; the electrochemical instrumentation block, which may include an electrochemical front-end chip that may include configurable amplifiers for various electrochemical measurements; and the iontophoresis sweat induction block, which may include a boost converter, a BJT array configured as a current mirror, and an analog switch for delivering current across the skin through the carbagel. In other embodiments, the blocks may include more or fewer features and may be assembled in other orders. The wearable system's workflow may involve the PSoC BLE module acting as a data bridge between the electrochemical AFE and a host software, encoding and writing measurement instructions to the electrochemical AFE, and transmitting the AFE's measurement data to the host software via BLE. The power consumption of the system may be characterized using a power profiler, and the charging-discharging curves of MSC may be collected using an electrochemical workstation.

The assembled 3D-printed microfluidic $e^3$-skin could conformally adhere to the skin and display selective and stable sensor performance under mechanical deformations. The $e^3$-skin's high biocompatibility and low cytotoxicity may be validated by culturing human dermal fibroblasts (HDF) and normal human epidermal keratinocytes (NHEK) cells using a commercial live/dead kit and PrestoBlue assay. The viability of HDF and NHEK cells may remain greater than 95% and their metabolic activities may increase during a 7-day culture.

Figure 2:
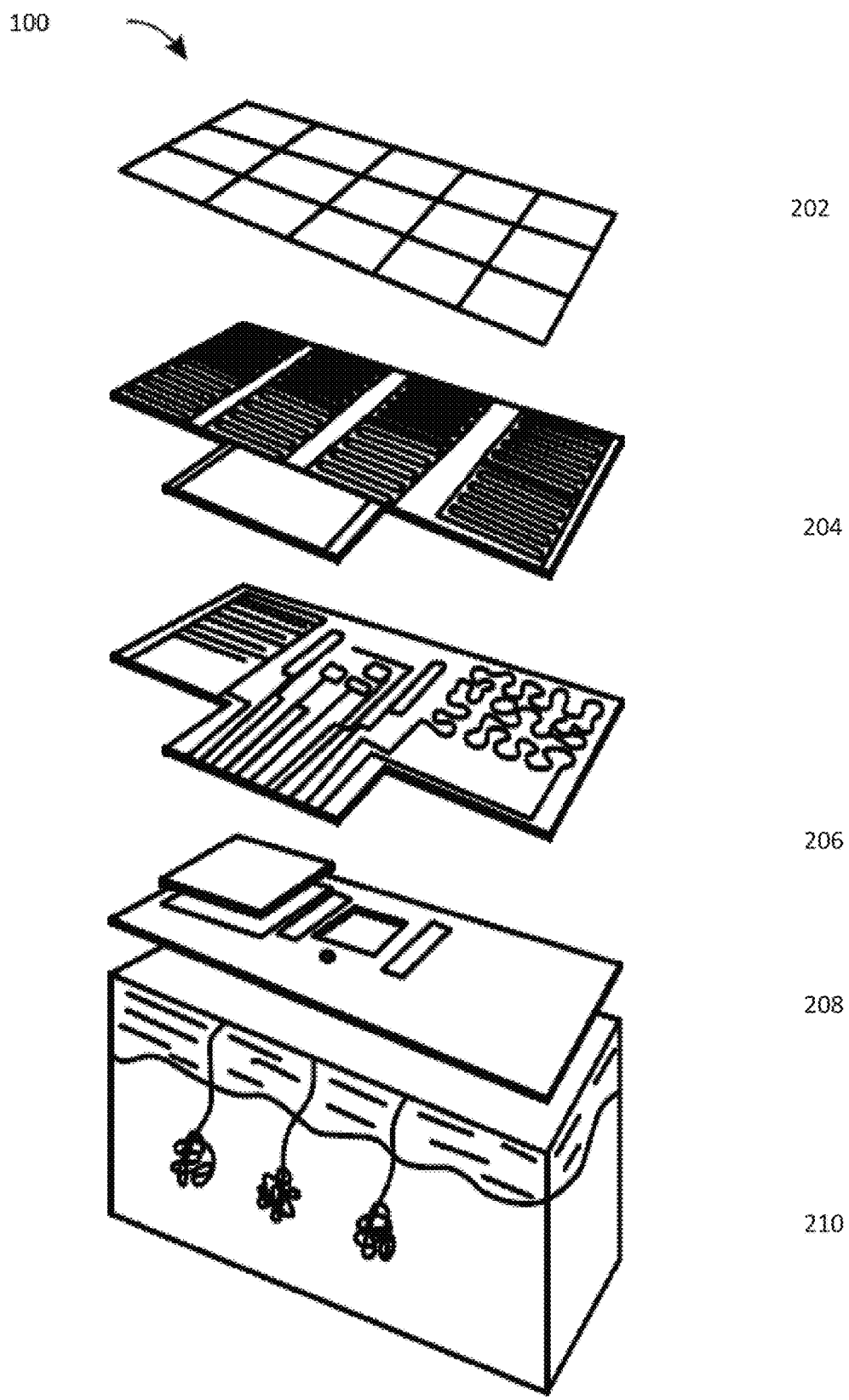
FIG. 2 is an example diagram showing an exploded illustration of a wearable system, in accordance with various embodiments of the disclosed technology.

FIG. 2 is an example diagram showing an exploded illustration of a wearable system, in accordance with various embodiments of the disclosed technology. The wearable system 100 may include an energy harvesting module layer 202, a MSC layer 204, a biosensor layer (or array of biosensor formed in a layer) 206, and a microfluidics component layer 208, all of which may be disposed on human skin 210 during use/monitoring.

Figure 3A:
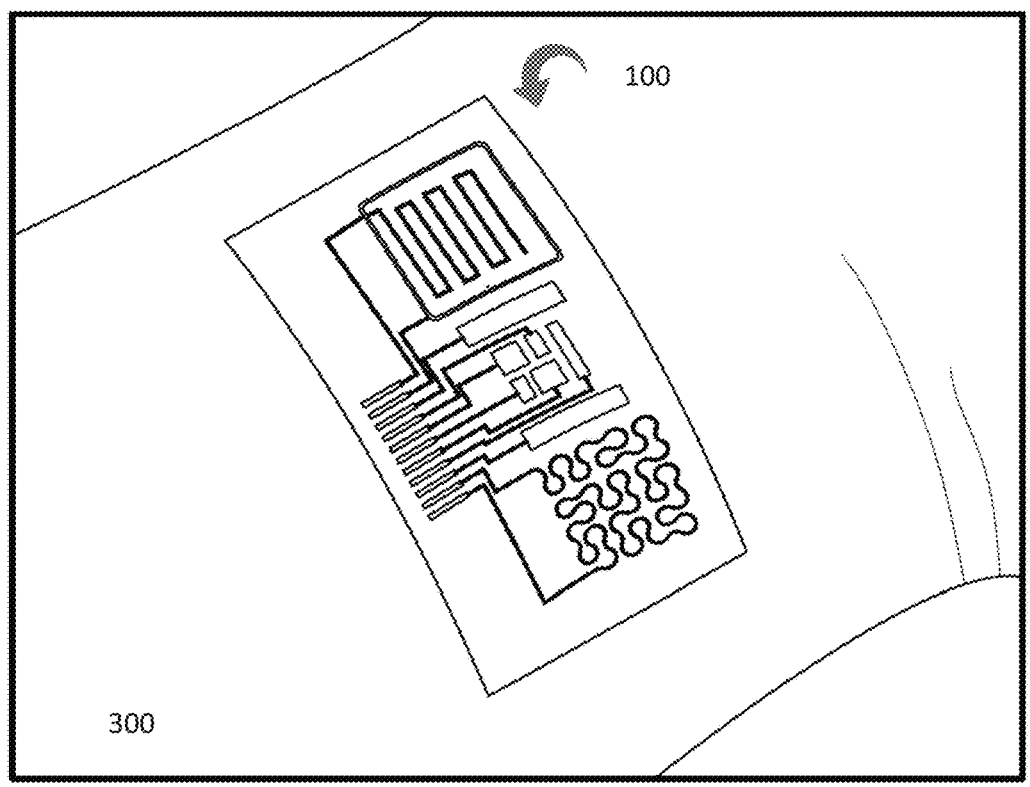
FIGS. 3A-3B are example diagrams a wearable system attached to the skin of a human subject, in accordance with various embodiments of the disclosed technology.
Figure 3B:
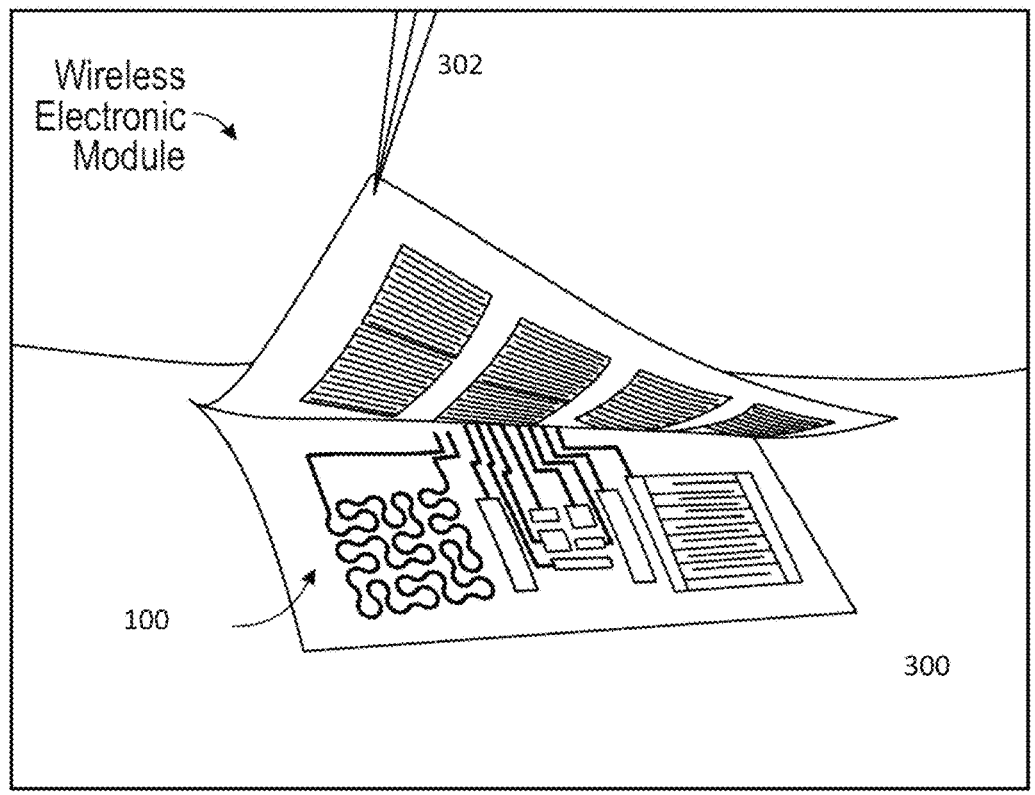

FIGS. 3A-3B are example diagrams a wearable system 100 attached to the skin 300 of a human subject, in accordance with various embodiments of the disclosed technology. In other words, FIGS. 3A-3B depict an example wearable system 100 secured to the skin 300 of a patient (FIG. 3A) and being comfortably removed with forceps 302 from the skin 300 of patient (FIG. 3B) due to the flexible nature of the system. The wearable system 100 may be constructed on an ultrathin flexible SBS substrate (for example, with a thickness of approximately 4 micrometers+/−1 micrometer) for flexibility and robustness. Additionally, embodiments of the present disclosure may be secured to the skin 300 of a human subject on or around the wrist of the patient, and as such may benefit from being flexible due to the curved nature of the typical human wrist.

Figure 4A:
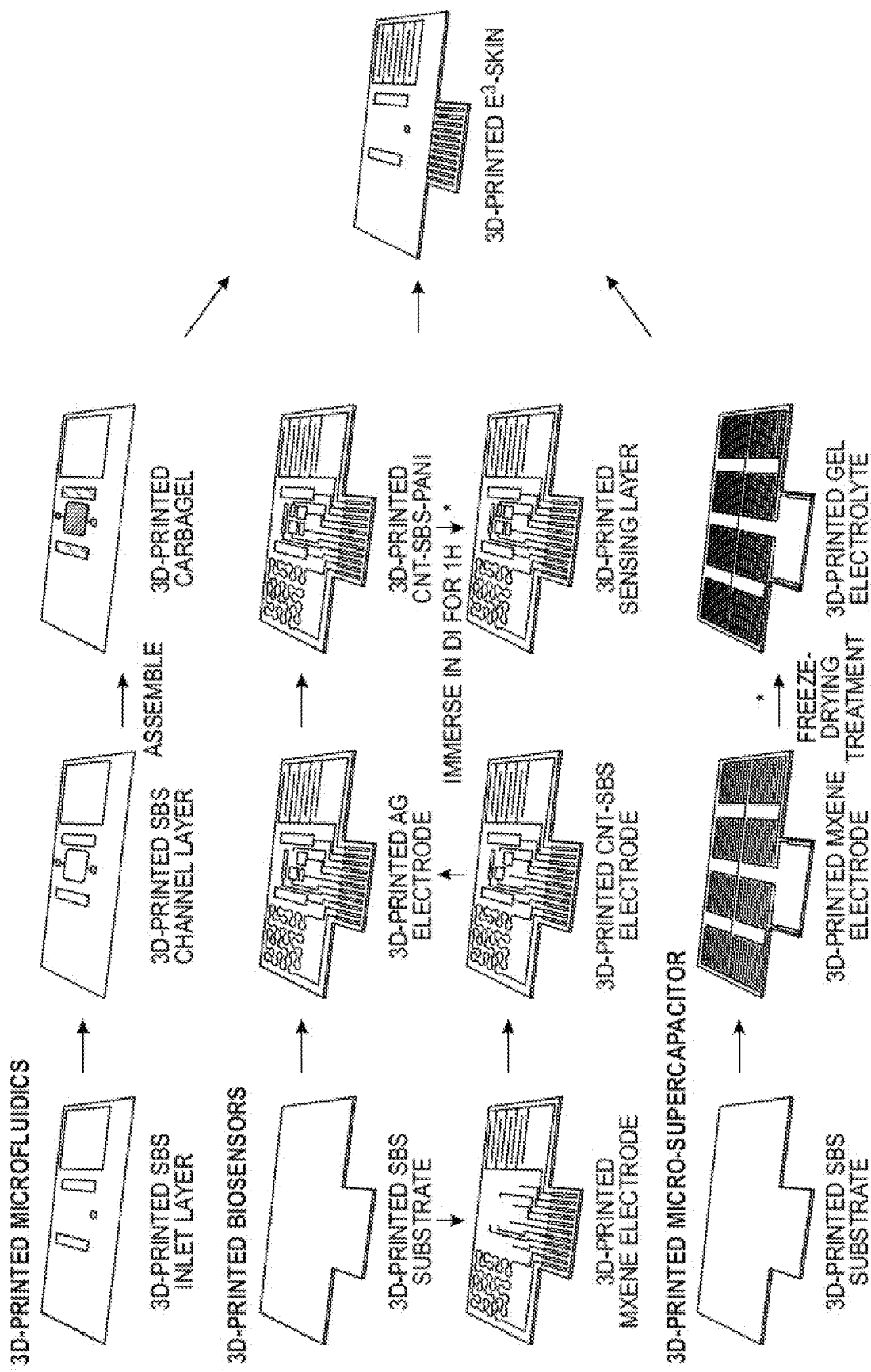
FIG. 4A is a flow diagram showing an example fabrication process of a wearable system, in accordance with various embodiments of the disclosed technology.

FIG. 4A is a flow diagram showing an example fabrication process of a wearable system, in accordance with various embodiments of the disclosed technology. In other words, embodiments of the semi-solid extrusion (SSE)-based 3D-printing sequence and assembly of the $e^3$-skin are schematically presented in FIG. 4A. SBS substrate may be printed on a glass slide with most or all electrodes and components being printed in sequence on the SBS substrate (unless specified otherwise) using a three-axis robotic deposition stage. The printing paths may be designed, for example, using AutoCAD or similar software and translated into G-code using a custom Python script. The customizable inks may be loaded into syringe barrels and fitted with appropriate nozzles. The extrusion of ink may be controlled by applying air pressure using a benchtop fluid dispenser or similar pressure control device. The printing pressure and speed may be optimized for each individual ink to achieve stable extrusion. In brief, the $e^3$-skin may be composed of up to, exactly, or more than 3 components: the 3D-printed microfluidics, the 3D-printed biosensors, and the 3D-printed micro-supercapacitor. Each of the SBS-based inks may have similar rheological performance, and can be dried quickly due to the fast evaporation of toluene after printing. For other aqueous inks, considering the small dimensions used in the present designs, the printed layer may dry quickly after printing. For the 3D-printed microfluidics component, SBS ink may be used to construct the microfluidics that may be composed of an inlet for sweat collection and a channel connecting the inlet to the sensor reservoir and routing to an outlet. After assembling the two layers, the iontophoresis carbagels may then subsequently be printed at the designated openings. For the 3D-printed biosensors, firstly, the MXene interconnects and electrodes for the temperature and pulse sensor may be printed on the SBS substrate. Then CNT-SBS ink may be used to print the working electrodes for the biochemical sensors, counter electrode, and iontophoresis electrodes, while CNT-SBS-PANI may be printed for the pH sensor and commercial Ag paint may be printed as the reference electrode. Following this step, the patch may be removed from the printing bed and immersed into deionized water to dissolve PEG to induce porous structure. After the patch is dry, the glucose and alcohol sensors may be prepared by sequentially dispensing MX-PB with different desired concentrations and their corresponding enzyme biopolymer inks on the respective CNT-SBS working electrodes. For alcohol sensor, a PU diffusion-limiting layer may be additionally printed. The disposable microfluidic sensor patches containing biosensors and carbagel-loaded electrodes may be fabricated with the biosensors and iontophoretic modules. Lastly, interdigital MXene electrodes may be printed on SBS substrate layer-by-layer and removed from the printing bed for freeze-drying treatment in a freeze dryer to induce porous architectures for improved performance. $PVA-H_2SO_4$ gel electrolyte may be printed over the electrodes and the entire micro-supercapacitor connected in series may be dried under a fume hood to vaporize the excess water.

Other embodiments may utilize other combinations of customizable inks for the various component features of the wearable system. Furthermore, as outlined in relation to FIG. 4A, each component feature of the wearable system may be printed on an SBS substrate and further stacked on top of previously printed component features, and then subsequently combined to assemble the wearable system. Different combinations of component features may exist and further combinations of microfluidics, biosensors, MSC, and other component features described throughout may collectively be considered the wearable system.

Figure 4B:
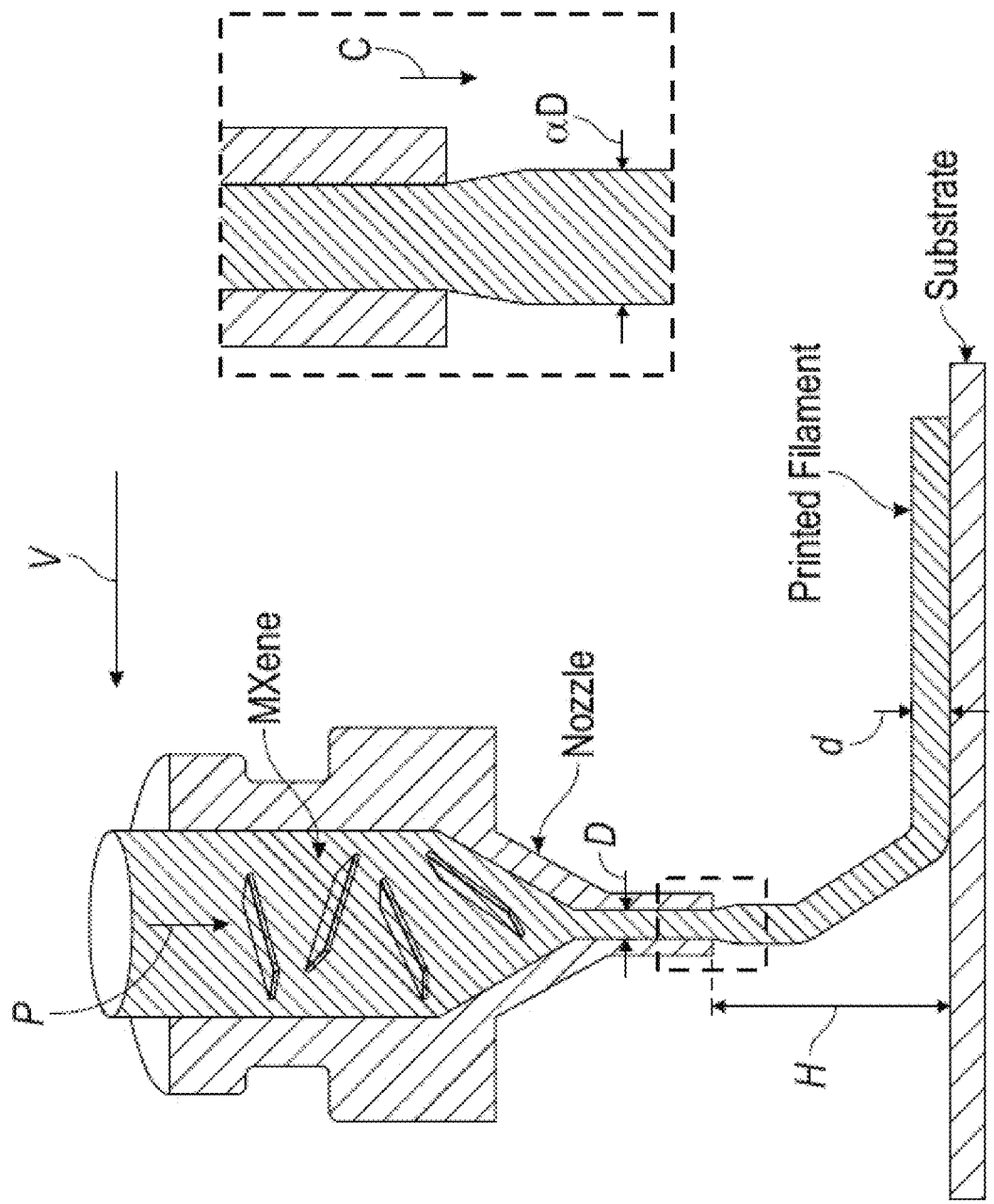
FIGS. 4B-D are example diagrams showing the schematics of example 3D-printing mechanisms, in accordance with various embodiments of the disclosed technology.
Figure 4C:
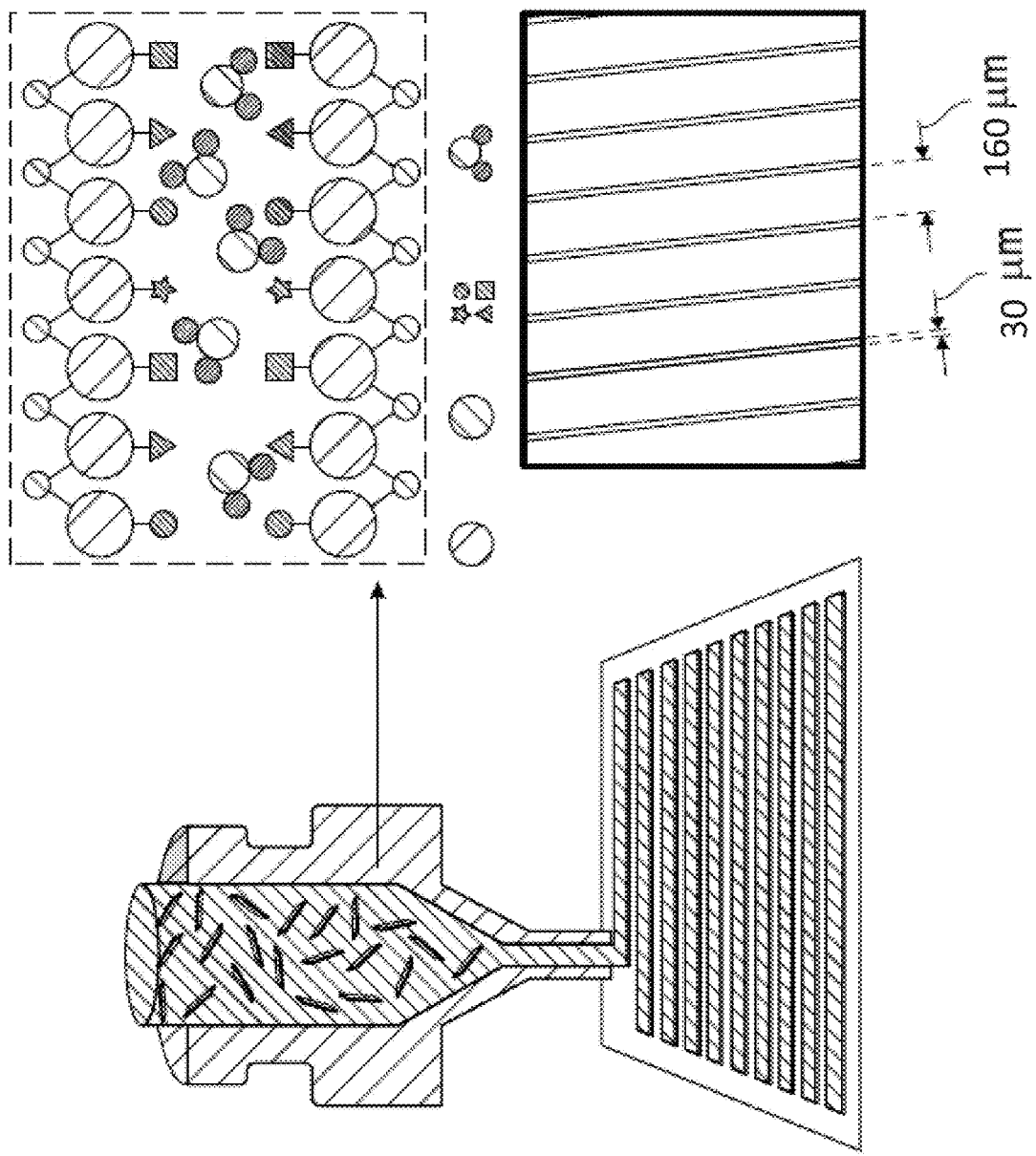
Figure 4D:
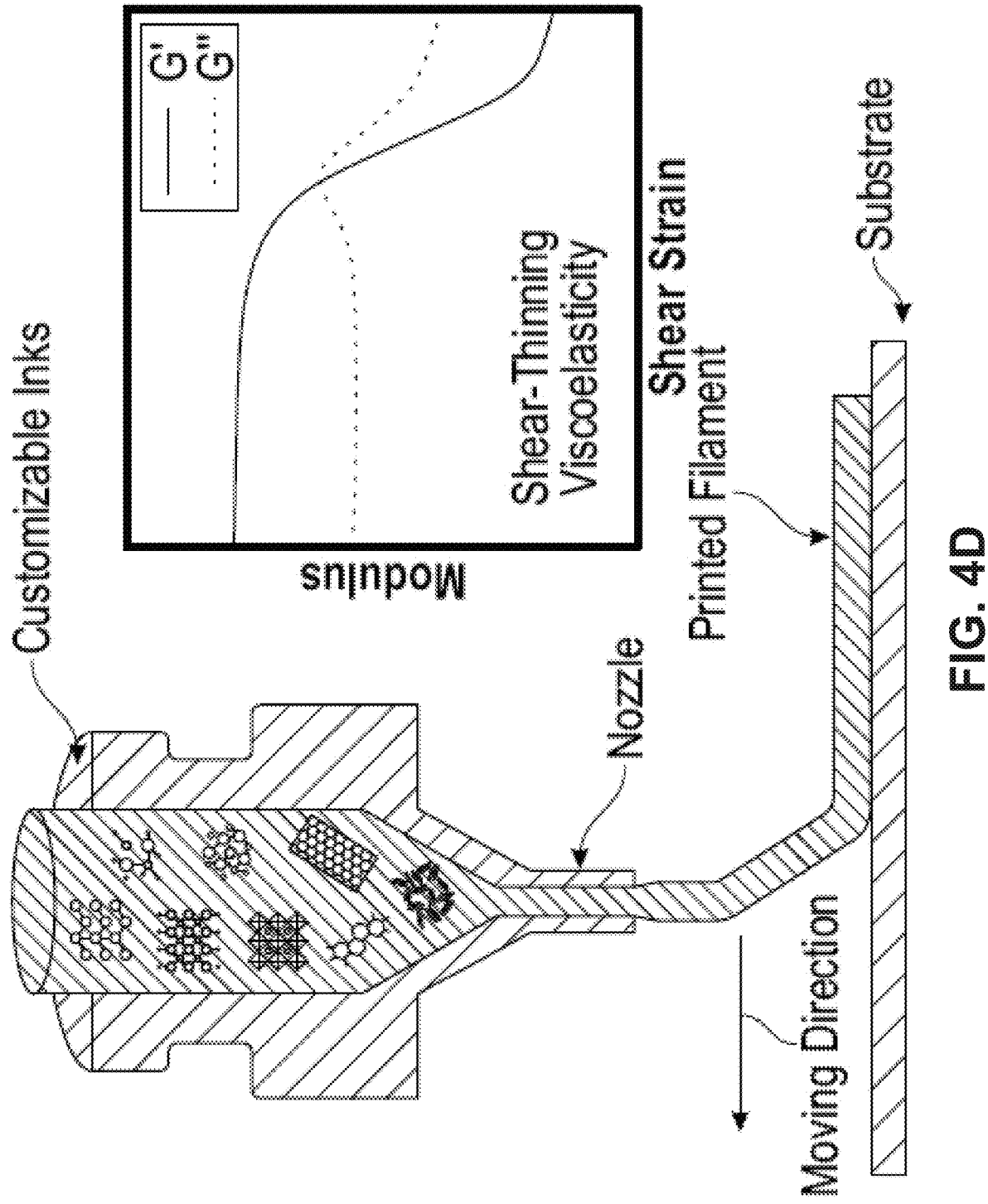
Figure 4E:
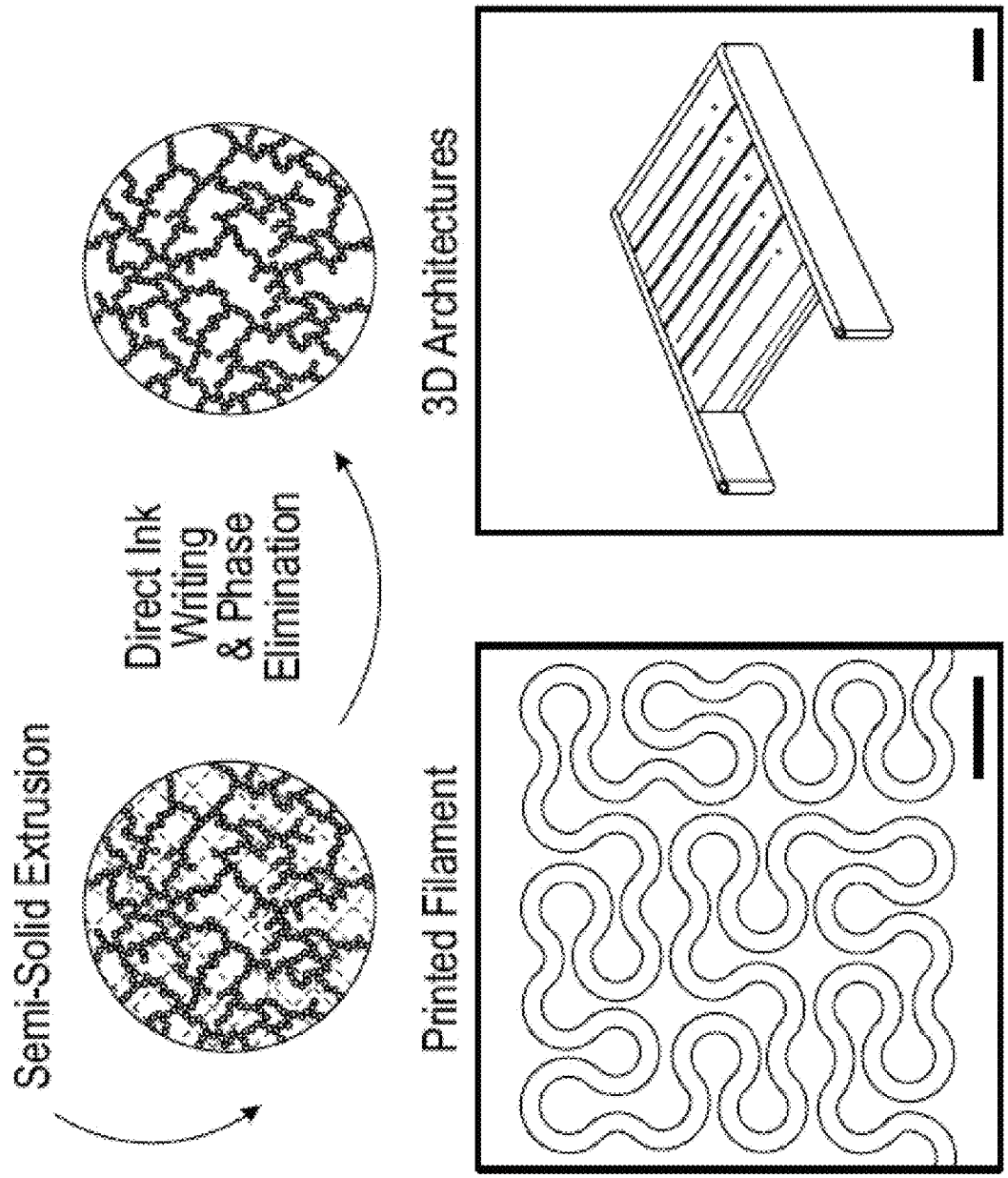
FIG. 4E is an example diagram showing MXene 3D-printed architectures, in accordance with various embodiments of the disclosed technology.

FIGS. 4B-D are example diagrams showing the schematics of example 3D-printing mechanisms, in accordance with various embodiments of the disclosed technology. FIG. 4B is an example schematic of an SSE-based 3D-printing of MXene filament, where V is printing speed, P is pressure, D is nozzle diameter, H is printing height, d is diameter of printed filament, C is extrusion speed, and alpha is die swelling ratio. FIG. 4C is an example schematic illustration of high-precision SSE-based 3D-printing using an aqueous MXene ink. Inset, is an example microscopic image displaying an array of 3D-printed MXene filaments with narrow gaps. FIG. 4D is an example schematic illustration of SSE printing procedures to prepare 2D and 3D architectures. The top right inset depicts typical rheological properties of printable inks. FIG. 4E is a diagram showing an example of MXene 3D-printed architectures, in accordance with various embodiments of the disclosed technology.

Figure 1B:
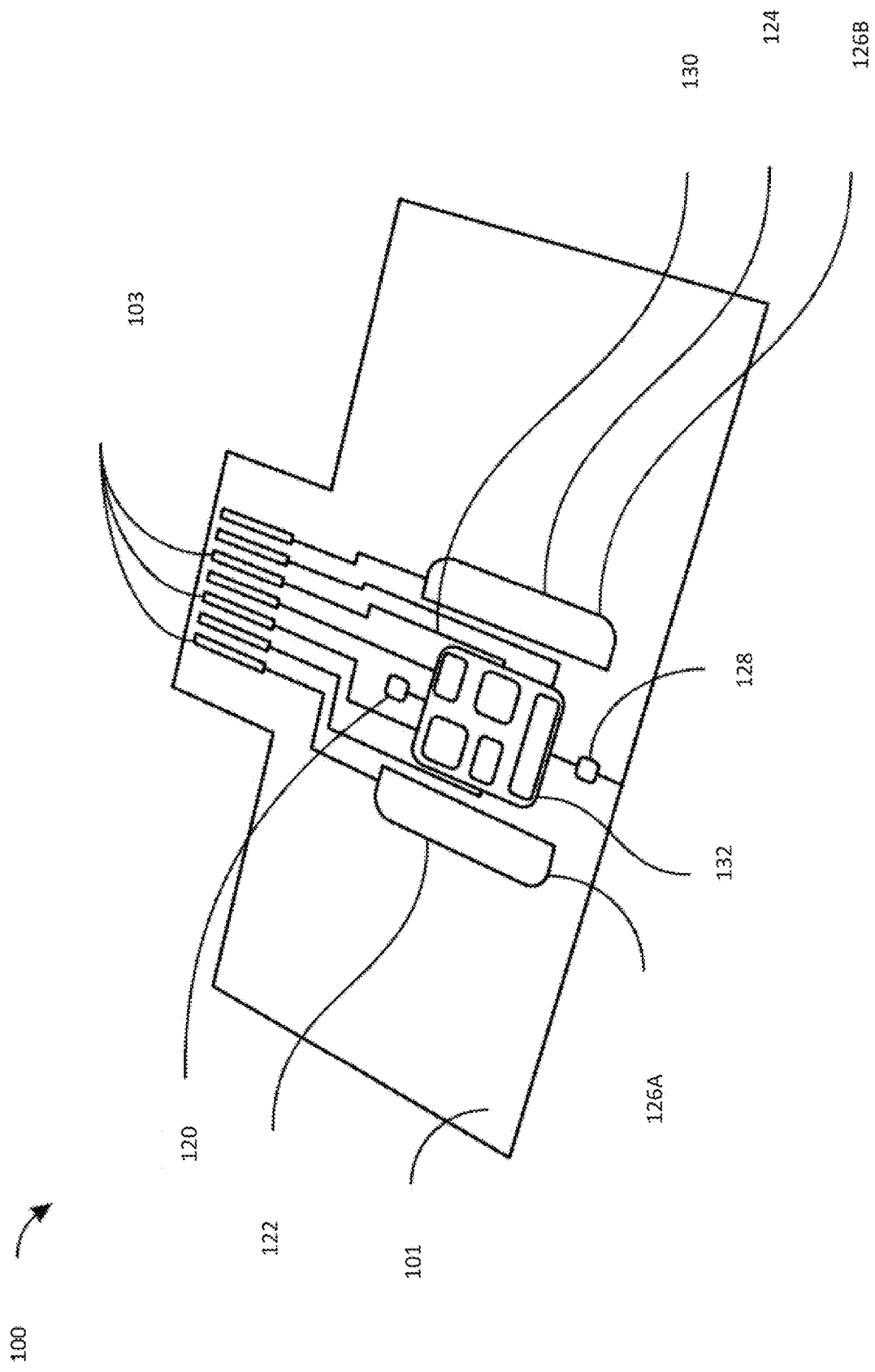

Various embodiments of the present disclosure may include biochemical sensors (as discussed in relation to FIGS. 1A-1B). The proposed SSE-based 3D-printing technology may be used to prepare electrochemical biosensors on the $e^3$-skin. For example, enzymatic biosensors may be fabricated through sequential printing of porous CNT-styrene-butadiene-styrene (CNT-SBS) as the working electrode (WE), MXene-Prussian blue (MX-PB) as the redox mediator, and the bioactive polymer (e.g., chitosan and bovine serum albumin (BSA)) loaded with enzymes (e.g., glucose oxidase (GOx) and alcohol oxidase (AOx)) as the target recognition element. Considering that high electrochemical activity and active surface area may be desired for electrochemical WEs, CNT-SBS may be used over multiple other carbon-based composite inks (e.g., graphite-SBS and carbon black (CB)-SBS) that fits the rheological criteria for SSE. Uniformly distributed porous structures may be introduced via phase elimination of polyethylene glycol (PEG) within a printed CNT-SBS-PEG composite (with optimized CNT and PEG ratio) to increase and/or maximize the active surface area of the WE. The optimized 3D-printed porous CNT-SBS WE may display a superior electrochemical performance compared to other commercial WEs such as glassy carbon electrode (GCE), screen-printed carbon electrode (SPE), and Au electrode (AuE), and may be able to detect ultra-low-level uric acid in sweat through direct oxidization.

To prepare the enzymatic electrochemical sensors, PB may be chosen as the redox mediator as it can enable low-voltage operation (~0 V vs reference electrode) and may minimize the interference from other electroactive molecules. Here, embodiments may use an in situ reduction strategy to formulate high-performance printable MX-PB as a mediator layer on top of the CNT-SBS WE. Transmission electron microscopy (TEM) images may depict uniformly deposited PB nanoparticles over the MXene film surface. The concentration of MX-PB may be tailored to a desired sensitivity and linear operating range according to the levels of target biomarkers in sweat. In particular, due to the charge transfer properties, including electron hopping and counter-ion movement, within PB layer, MX-PB resulted in a high sensitivity, while an increased concentration of MX-PB led to a decreased sensitivity and wide linear operating window due to the slower charge transfer kinetics. It is noteworthy to mention that the incorporation of MX-PB in the mediator layer may enhance both sensitivity and detection limits as compared to neat PB due to the synergistic hybridized network that enhances electronic coupling for interfacial electron transfer.

Customized inks including enzymes (i.e., GOx and AOx) and bioactive polymers (i.e., chitosan and BSA) may be directly printed on the MX-PB mediator layer to prepare glucose and alcohol sensors suitable for wearable sweat analysis. Considering that sweat alcohol concentration after alcohol intake can be as high as tens of mM, a polyurethane diffusion-limiting membrane may be introduced to improve the current stability and widen the linear range, and the developed alcohol sensor may demonstrate high stability over prolonged periods and multiple cycles of measurements. Both enzymatic sensors may show high reproducibility and selectivity over other metabolites typically found in sweat, and may be able to reliably detect the analyte-level changes when sampled at physiological sweat rates.

Embodiments of the present disclosure that include a pH sensor in the $e^3$-skin may be designed based on a CNT-SBS-polyaniline (PANI) electrode printed with an ink made of, for example, PANI powder and CNT-SBS. pH may be measured as a function of potential changes caused by protonation/deprotonation on the PANI surface. It should also be noted that to accurately quantify sweat glucose and alcohol levels, real-time or near-real-time sensor calibrations may be performed based on the simultaneously obtained pH and temperature information to compensate the influence of pH and temperature on the enzymatic reactions.

As depicted in FIGS. 4B-E, various customizable inks may be used to produce the $e^3$-skin. The various component layers of the $e^3$-skin may be printed using different combination of customizable inks, each of which may be uniquely mixed for the purpose of the layer. Exemplary customizable inks are outlined below.

MXene ink. MXene nanosheets may be synthesized using a minimally intensive layer lamination (MILD) method, as depicted, for example, in FIG. 4B. Lithium fluoride may be dissolved in hydrochloric acid and $Ti_3AlC_2$ MAX phase powder may be gradually added into an etchant under continuous stirring at room temperature. The mixture may be proceeded to react for 48 hours at 40 degrees Celsius. Once the reaction is complete, the acidic mixture may be washed multiple times with deionized water by centrifugation until the pH becomes neutral. The dark-green supernatant may be discarded, and deionized water may be added to the sediment. This may be followed by vigorous shaking using a vortex machine or similar. The dispersion may then be centrifuged and the supernatant may be collected. The solution containing exfoliated MXene nanosheets dispersion may be centrifuged again to remove the residual impurities. After discarding the supernatant, the aqueous 'clay-like' MXene sediment may be collected and mixed homogenously using a planetary centrifugal or similar. The MXene ink at this point may be used to print the MXene interconnects and biophysical sensors. The desired concentration of the ink can be tuned by either diluting it with water or subjecting it to gentle evaporation in a vacuum oven. For printing of MXene micro-supercapacitors (MSCs) and other 3D architectures, a highly concentrated ink may be used.

MX-PB ink. A solution containing $FeCl_3$, $K_3[Fe(CN)]_6$, KCl, and HCl may be added dropwise into a MXene dispersion at a volume ratio of approximately 1:1 under continuous stirring. The mixture may then be bath-sonicated to speed up the reduction process of PB nanoparticles. For the washing process of MX-PB ink, the supernatant may be replaced after each centrifugation with deionized water. Desired concentrations of MX-PB for the mediator of the biochemical sensors may be obtained by adding the appropriate amount of deionized water.

SBS and SBS composite inks. Styrene-butadiene-styrene (SBS) ink may be prepared by dissolving SBS in toluene by ultrasonication. To formulate carbon nanotube (CNT)-SBS, graphite-SBS, and carbon black (CB)-SBS inks, a specified amount of the respective fillers may be homogenously mixed into the SBS ink using a planetary centrifugal or similar device. To develop CNT-SBS-polyethylene glycol (PEG) ink for the preparation of working electrodes, PEG and CNT may be homogenously mixed into the SBS ink. Based on the phase separation strategy, by immersing the as-printed electrode in the deionized water at room temperature, a porous CNT-SBS electrode may be obtained with the complete (or near complete) removal of PEG due to PEG's high solubility and fast dissolution rate. By modulating the composition inks with different ratios of CNT and PEG, porous the CNT-SBS electrodes may be further optimized to achieve satisfactory electrochemical performance. Similarly, to obtain porous CNT-SBS-PANI electrodes, CNT, polyaniline (PANI) and PEG may be homogenously mixed into the SBS ink and PEG may be subsequently dissolved in deionized water after printing.

CNT-PDMS ink. Multi-walled CNTs may be dispersed with polydimethylsiloxane (PDMS) base resin through the aid of toluene at a volume ratio of approximately 1:4. The mixture may be stirred to ensure the homogeneous dispersion of CNTs. Meanwhile, salt microparticles may be prepared by grinding the NaCl particles with a grinder or similar device. Subsequently, the curing agent and salt microparticles at varying ratios may be mixed homogeneously into the dispersion.

Enzyme-biopolymer ink. Chitosan may be dissolved in acetic acid and bovine serum albumin (BSA) may be dissolved in phosphate-buffered saline (PBS). For glucose enzyme ink, the chitosan solution may be mixed thoroughly with glucose oxidase ($GO_x$) solution at a volume ratio of approximately 2:1. For the alcohol enzyme ink, alcohol oxidase ($AO_x$) may be used. Subsequently, the chitosan and BSA solutions may mixed thoroughly with $AO_x$ at a volume ratio of approximately 1:1:8.

PU diffusion-limiting membrane ink. A tetrahydrofuran (THF) solution containing dimethylformamide (DMF) was prepared followed by dissolving polyurethan (PU) by ultrasonication.

Agarose-gelatin carbagel. Agarose and gelatin may be added into deionized water and heated until the solution turned homogeneous. The mixture may then cooled down and carbachol or potassium chloride (KCl) may then be added into the mixture to develop carbagel for printing on the anode and cathode, respectively.

$PVA-H_2SO_4$ gel electrolyte. Poly(vinyl alcohol) (PVA) may be dissolved in deionized water and mixed with $H_2SO_4$. The mixture may be heated and stirred until the solution becomes clear.

Other combinations of customizable inks may be used for 3D-printing other components of the wearable system as well. For example, Table 1, below, outlines various customizable inks examples for $e^3$-skin fabrication. Other combinations may exist.

TABLE 1

Customizable Inks for e3-skin Fabrication

| Customizable inks | Printed components | Ink formulation |
|---|---|---|
| MXene | Biophysical sensors & interconnects | 60 mg $mL^{-1}$ MXene in water |
| MXene | Micro-supercapacitor electrodes | 120 mg $mL^{-1}$ MXene in water |
| CNT-PDMS | Pressure sensor | 3 wt % CNT with PDMS in toluene (1:4) |
| Ag | Reference electrode | Commercial Ag paint |
| CNT-SBS | Working & counter electrode | 9 wt % CNT + 7 wt % PEG + 25 wt % SBS in toluene |
| CNT-SBS-PANI | pH sensor | 9 wt % CNT + 5 wt % PANI + 7 wt % PEG + 25 wt % SBS in toluene |
| SBS | Substrate & microfluidics | 25 wt % SBS in toluene |
| MX-PB | Sensing layer | 1 & 10 mg $mL^{-1}$ MX-PB in water |
| Carbagel | Iontophoresis | 2 wt % agarose + 5 wt % gelatin + 1 wt % carbachol/KCl in water |
| $PVA-H_2SO_4$ | Gel electrolyte | 10 wt % PVA + 12 wt % $H_2SO_4$ in water |
| GOx | Enzymatic layer | 1 wt % chitosan in 0.1 M acetic acid + 10 mg $mL^{-1}$ GOx in PBS (2:1) |

TABLE 1-continued

Customizable Inks for e3-skin Fabrication

| Customizable inks | Printed components | Ink formulation |
|---|---|---|
| PU | Diffusion limiting layer | 2 wt % DMF + 3 wt % PU in THF |
| AOx | Enzymatic layer | 1 wt % chitosan in 0.1 M acetic acid + 10 mg mL$^{-1}$ BSA in PBS + AOx (1:1:8) |

Figure 5A:
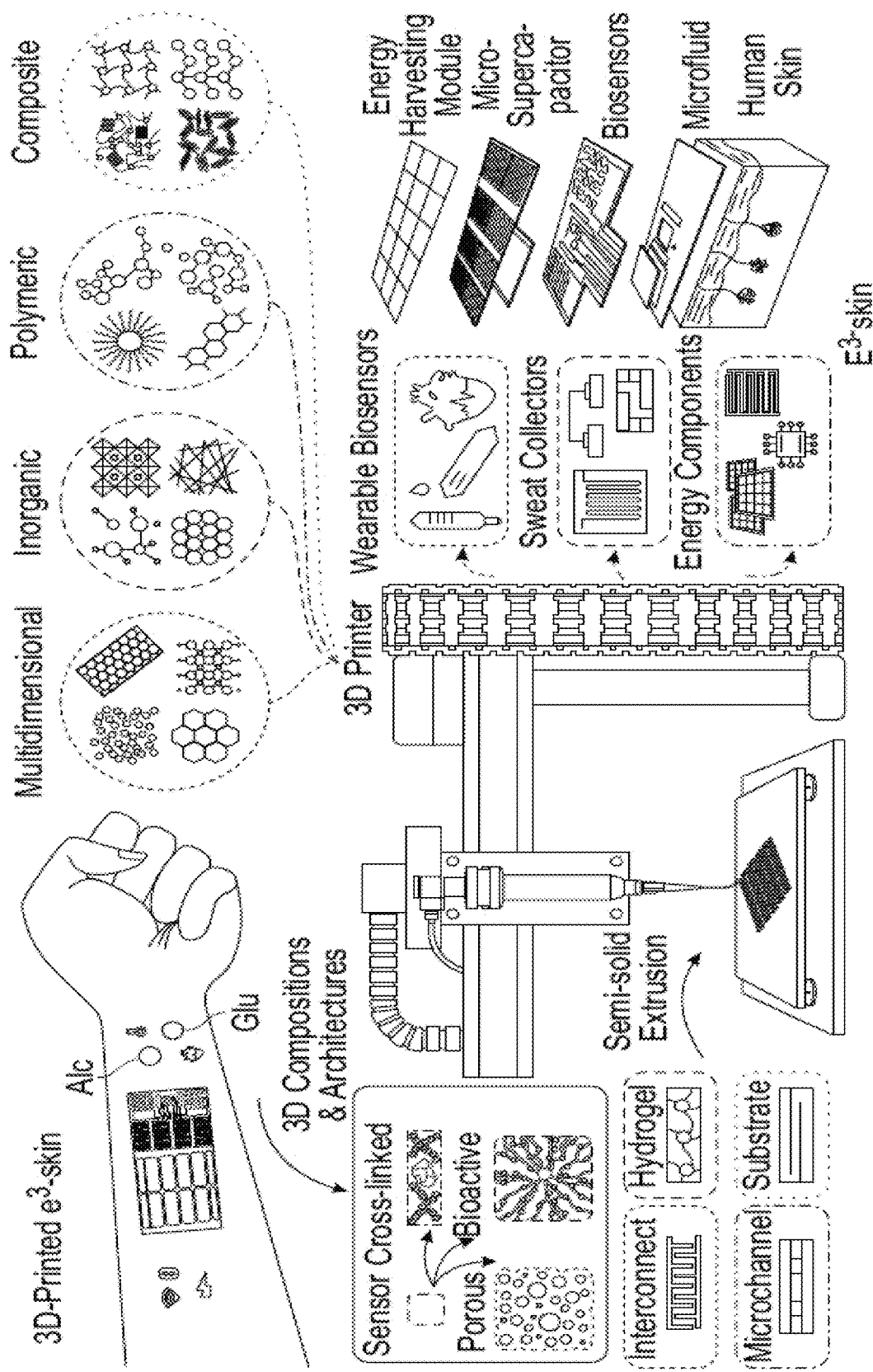
FIG. 5A is an example illustration showing a process a wearable system may perform to continuously monitor multimodal physiological and biochemical responses from skin and perform artificial-intelligence-powered health surveillance, in accordance with various embodiments of the disclosed technology.

FIG. 5A is an example illustration showing a process a wearable system may perform to continuously monitor multimodal physiological and biochemical responses from skin and perform artificial-intelligence-powered health surveillance, in accordance with various embodiments of the disclosed technology.

Figure 5B:
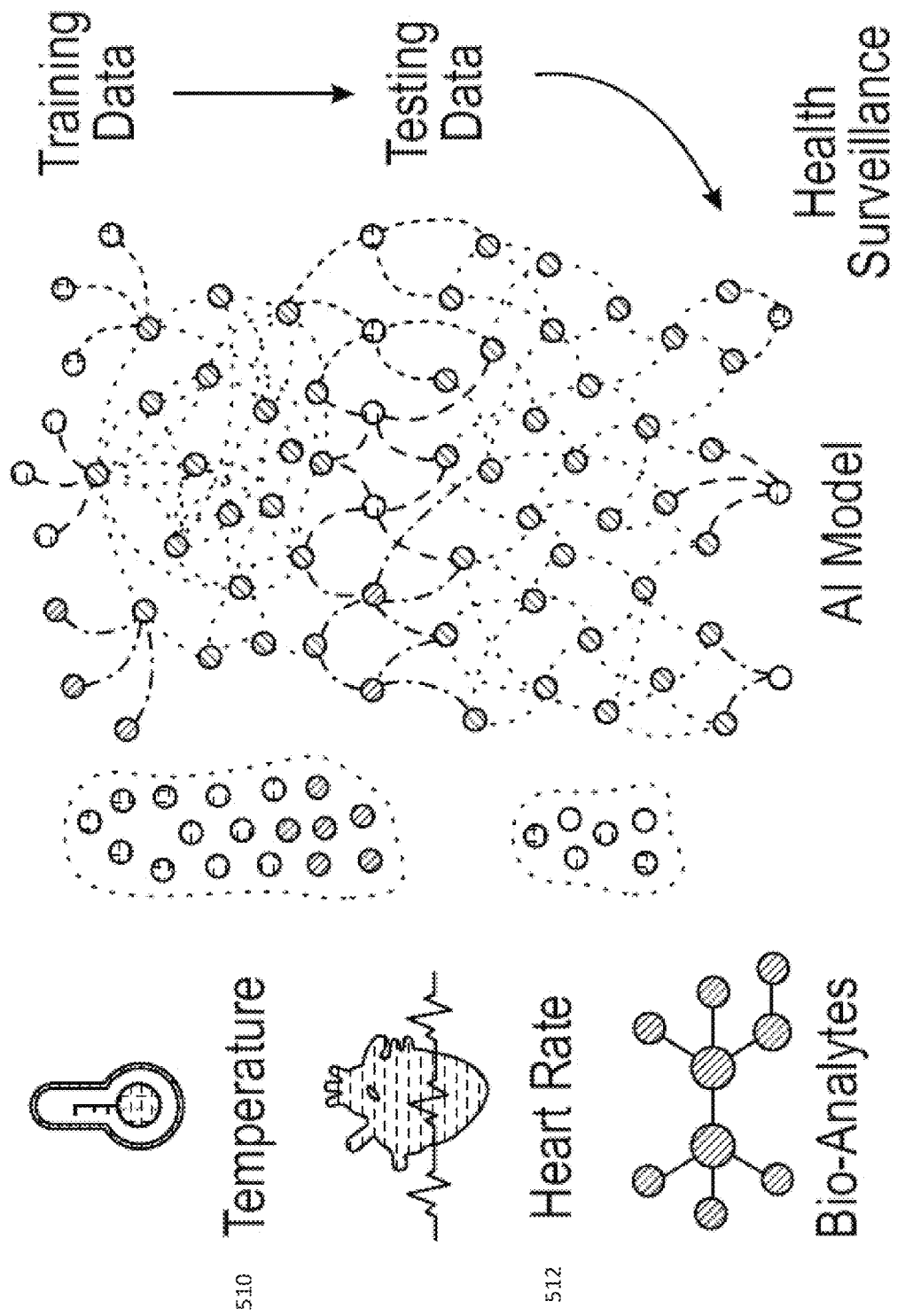
FIG. 5B is an example of a diagram showing a machine learning process for a wearable assessment system's classification and assessment, in accordance with various embodiments of the disclosed technology.

FIG. 5B is an example of a diagram showing a machine learning process for a wearable assessment system's classification and assessment, in accordance with various embodiments of the disclosed technology.

The wearable system (e.g., the wearable system 100 of FIGS. 1A-4A) may further include a smart device. In some embodiments, the smart device may be a computing device, such as a processor that stores non-transitory machine readable instructions, and may further be connected to the wearable system via wired or wireless communication methods, or alternatively, may be integrated into the wearable system for real- or near-real-time processing. The smart device may be configured for wireless communication with an external smart device (e.g., a cell phone) or computer. Wireless communication may occur via Wi-Fi, Bluetooth, or other wireless communication methods. The smart device may be configured for wired communication with a mobile device or computer, and with the use of various wired communication system. The mobile device may be a smart phone or other wireless device, such as a tablet, equipped with an application. The application may display detected health information, including stress assessments determined by the wearable assessment system. The application may also be used to analyze, organize, and/or transmit collected health data from the wearable system.

The smart device may be preprogrammed with various steps for determining health status or various other health monitoring or surveillance metrics. The steps may be performed using machine learning or supervised learning methods. The steps may include determining a subject profile from measured vital signs, metabolite concentrations, and/or electrolytes. Such subject profile may be determined from the data produced by logical circuits via the measurements taken by the multimodal sensor patch or included in the wearable system. The subject profile may be initially trained with a supervised learning model (as discussed below) and subsequently analyzed using an unsupervised machine learning model and/or trained with the supervised learning model to produce health status assessments based on the subject profile. The resulting evaluation may be displayed to the user on a graphical user interface in combination with other methods to produce a health status assessment or health monitoring/surveillance metric (as discussed below).

To form the subject profile, the smart device may analyze individual, or a combination of, the detected metabolite concentrations, the detected electrolyte concentrations, and/or the monitored vital signs (e.g., temperature 510, heart rate 512, bio-analytes 514). The individual concentrations and/or monitored vital signs may be used in combination with a machine learning or artificial intelligence (AI) model to determine a health status assessment or health monitoring/surveillance metric, which may be displayed to the user. The health assessment may be based, wholly or in part, on the analyzed metabolite concentrations, analyzed electrolyte concentrations, and/or monitored vital signs. The wearable system may use an unsupervised machine learning model to determine the health assessment, which is in whole or in part based on the supervised learning model. The machine learning model may include data streaming, data preprocessing and feature extraction, supervised learning, stressor classification, and stress response classification. In some embodiments, the machine learning model may have both the input (e.g., biomarker concentrations and vital signs) and output (e.g., health assessment) known, for example, by comparing input with questionnaires (e.g., in a supervised learning model). While in other embodiments, the machine learning model may only have the input known and the output is determined based on the supervised learning model in combination with other unsupervised machine learning methods. Health assessments may include various types of determinations including health status detection, health status type, and health status level.

The unsupervised machine learning model trained besides the supervised learning model may include data preprocessing and feature extraction. The machine learning methods derived from the supervised learning model may include performing data preprocessing asynchronously to extract features. For example, data preprocessing may include a pulse feature extraction algorithm. Through the pulse feature extraction algorithm, each pulse waveform collected could be analyzed and applied to a floor function to select the closest pulse feature within each time interval. Data preprocessing may also include manually shifting signals from the biomarker sensors (e.g., electrolyte and/or metabolite sensors) by a given time (e.g., approximately 300 seconds) to align with physical signals due to natural sweat delay. Data preprocessing may also include extracting heart rate data in figure plots from the pulse features and smoothing the heart rate data by the moving average (MA) for a period of time (e.g., approximately 100 seconds) to show the trends more clearly. Data preprocessing may include recording the time stamp when each subject expressed health markers, and performing manual data labelling. Data preprocessing may include normalizing some or all features with regard to each subject during each test/monitoring, to minimize variations from intra subject responses and to generalize the model among the population. Data preprocessing may include shuffling the training and testing datasets and dividing them into 8:2, respectively. Data points may be randomly selected using an equal representation of each class.

The machine learning methods derived from the unsupervised learning model may further include validating feature extraction before developing supervised learning models by projecting the multidimensional feature space into 2D space by means of t-distributed stochastic neighbor embedding, where data from stress/relaxation may naturally form distinctive clusters, which can be indicative of the discriminative power of the features.

The machine learning methods derived from the supervised learning model 552 may further include developing machine learning models to link biological and chemical features to health status. Training models for developing supervised learning models can be built based on the data collected from various subjects' health determinations. Signals on the wearable system can be calibrated and normalized to ensure that the features extracted after data preprocessing were stable against patch variations and moderate motion artifacts during the training. The supervised learning models may be trained using, for example, linear and radial basis function SVMs, logistic and ridge regression, conventional decision trees and gradient-boosted decision tree Extreme Gradient Boosting (XGBoost) models, as well as other machine learning models. The machine learning methods derived from the supervised learning model 552 may include limiting the various trained models to a model for health status detection and a model for health status monitoring. In some embodiments, the models for health status detection and a model for health status monitoring are the same, while in other embodiments, the models for health status detection and a model for health status monitoring are different.

The machine learning methods derived from the supervised learning model may further include extracting features from health status regions for overall health status evaluation. Extracting features from health status may include taking average signal changes from the MA of sensors. The machine learning methods derived from the supervised learning model may further include training and evaluating machine learning models including linear regression and SVM. The reduced size of the datasets of these models could prevent overfitting. The machine learning methods derived from the supervised learning model could also include performing a brute-force examination of features to compare the contributions of physicochemical biomarkers.

During health status classification, the machine learning methods derived from the supervised learning model may further include a feature importance evaluation for each biomarker towards each health status determination to evaluate each physicochemical sensor's contribution to the model. The biomarkers considered by the machine learning methods derived from the supervised learning model may include glucose, lactate, UA, sodium, ammonium, potassium, and any relevant vital sign (e.g., pulse, GSR, skin temperature, etc.), in addition to other metabolites and electrolytes relevant to health status assessment. The feature importance evaluation may be conducted using a Shapley additive explanation (SHAP). Through SHAP analysis, the feature importance of each biomarker may indicate that these biomarkers play an important role in health status classification.

The machine learning methods derived from the supervised learning model may include an evaluation of health status levels. The methods may include using a trained XGBoost regression model and predicting health status levels. Such methods may include an evaluation of the relevance of each feature using SHAP analysis. Through SHAP analysis, a SHAP value could be determined for each feature, which can be indicative of the relative importance of each feature in the machine learning model. From such analysis, it may be determined which biomarkers play an important role in health status level.

Figure 5C:
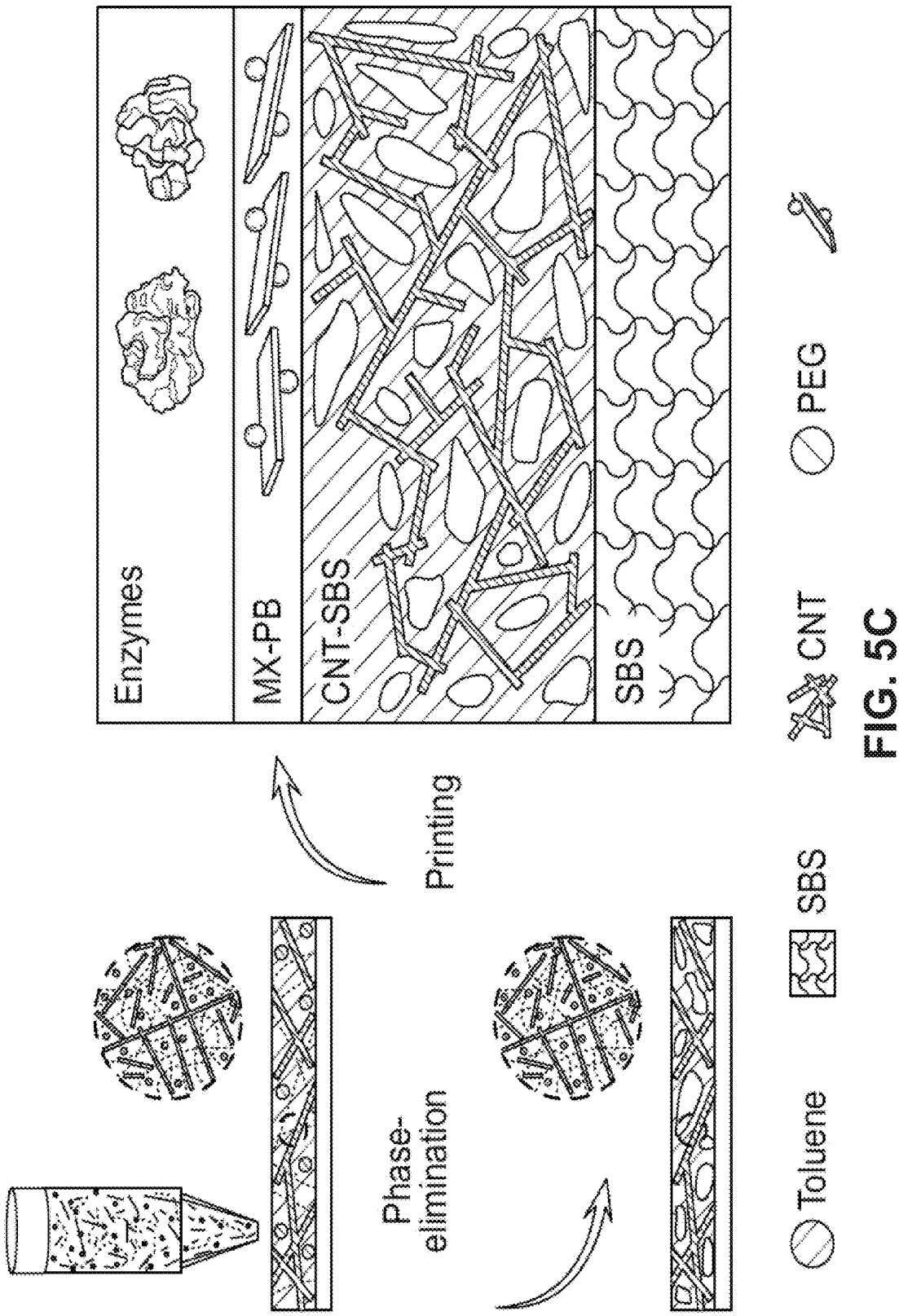
FIG. 5C is an example schematic of the design and SSE-based 3D-printing process for an enzymatic sensor, in accordance with various embodiments of the disclosed technology.

FIG. 5C is an example schematic of the design and SSE-based 3D printing process for an enzymatic sensor, in accordance with various embodiments of the disclosed technology. FIG. 5C is a further example of the process utilized and explained in relation to FIGS. 4B-4E.

Figure 5D:
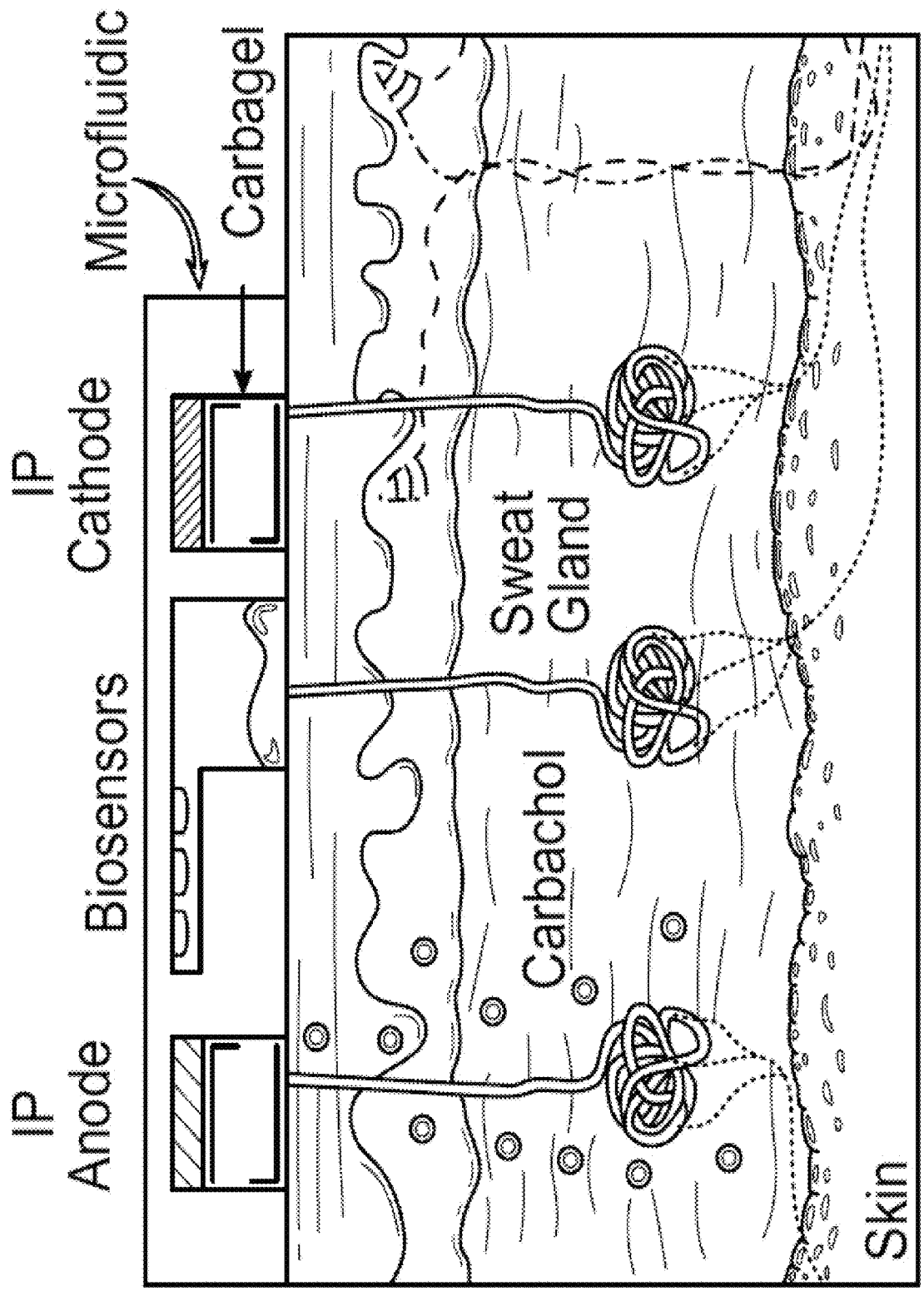
FIG. 5D is an example diagram of a microfluidics-based localized iontophoretic sweat induction system, in accordance with various embodiments of the disclosed technology.

FIG. 5D is an example diagram of a microfluidics-based localized iontophoretic sweat induction system, in accordance with various embodiments of the disclosed technology. FIG. 5D further depicts the process utilized and described in relation to FIGS. 1A-1B for induction of sweat using a sweat stimulation agent and electrodes.

Figure 6A:
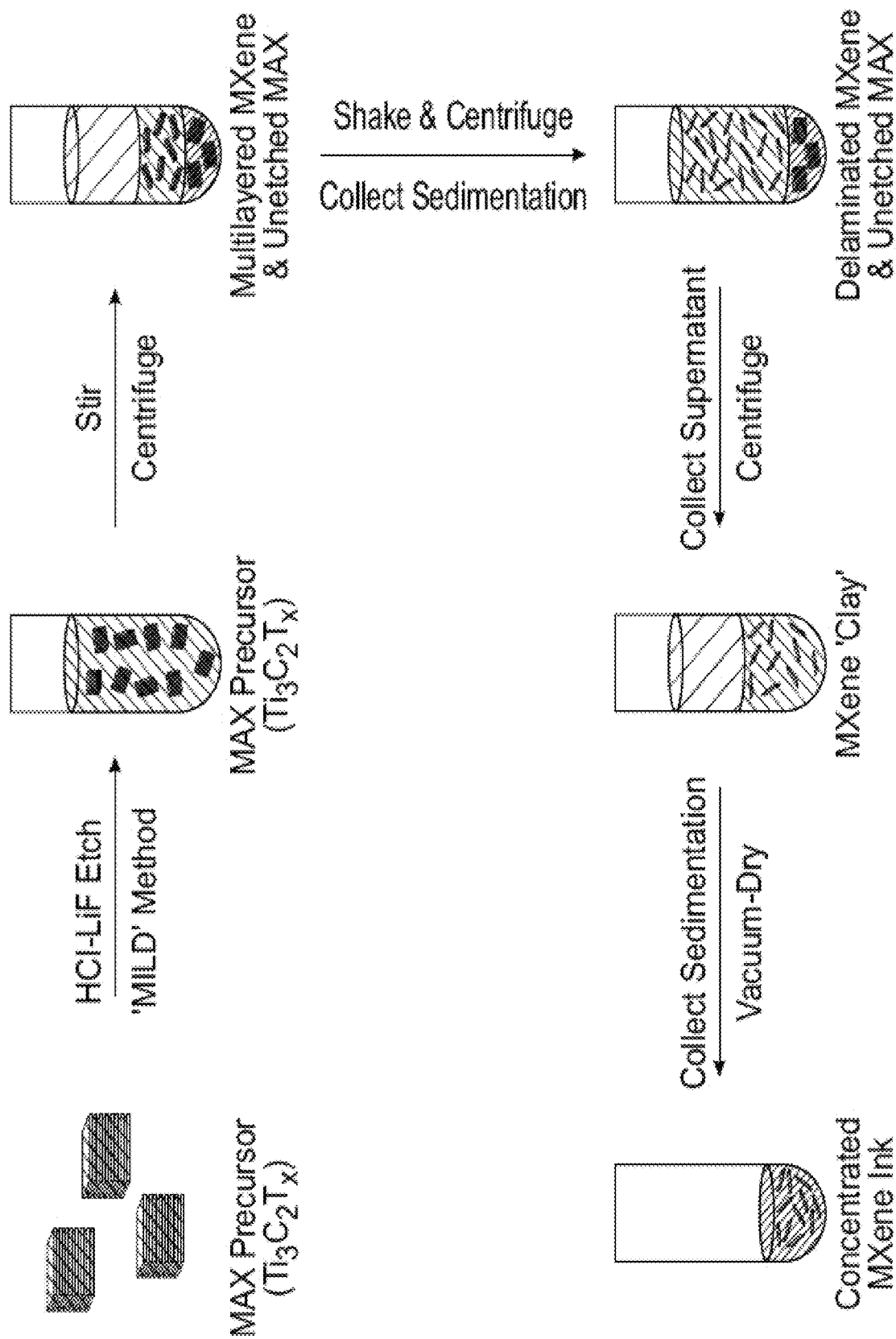
FIG. 6A is an example illustration of a process to prepare concentrated MXene customized inks, in accordance with various embodiments of the disclosed technology.
Figure 6B:
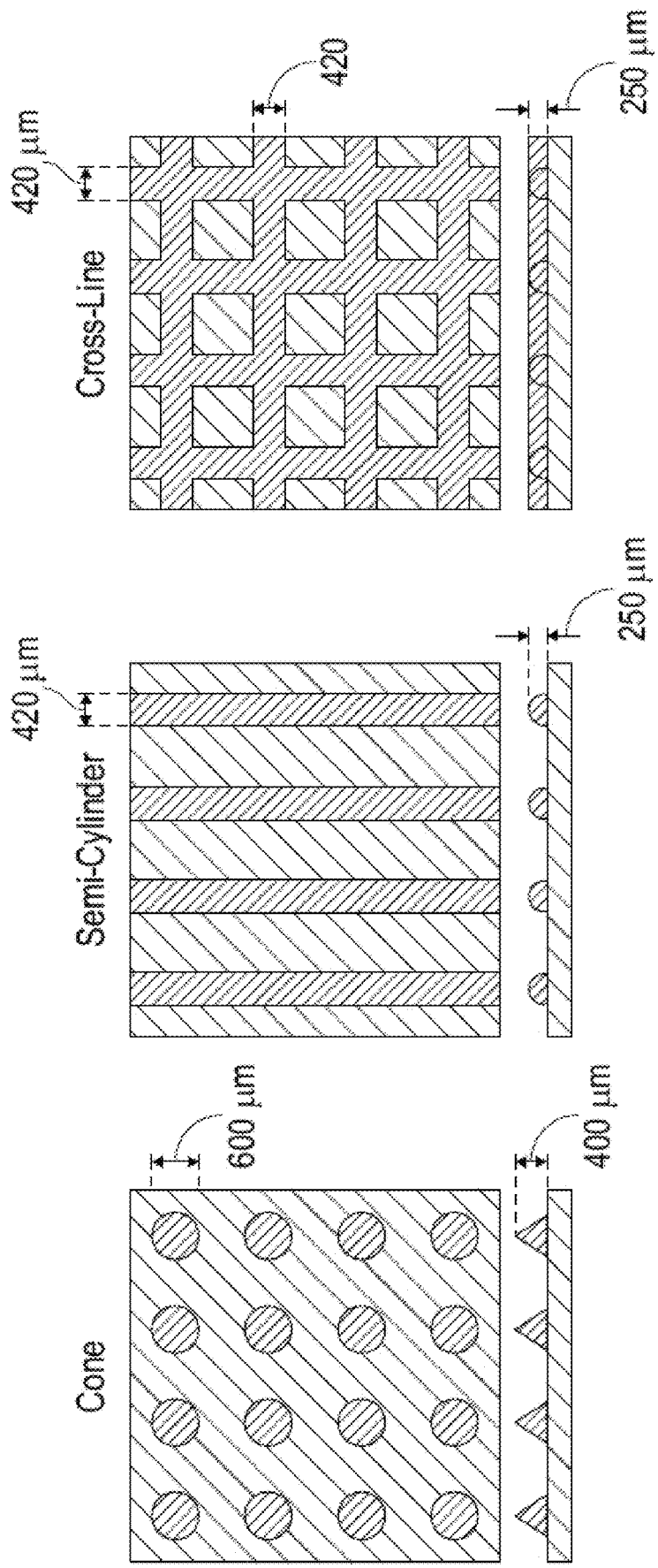
FIG. 6B is an example illustration of three pressure sensors with different surface architectures, in accordance with various embodiments of the disclosed technology.
Figure 6C:
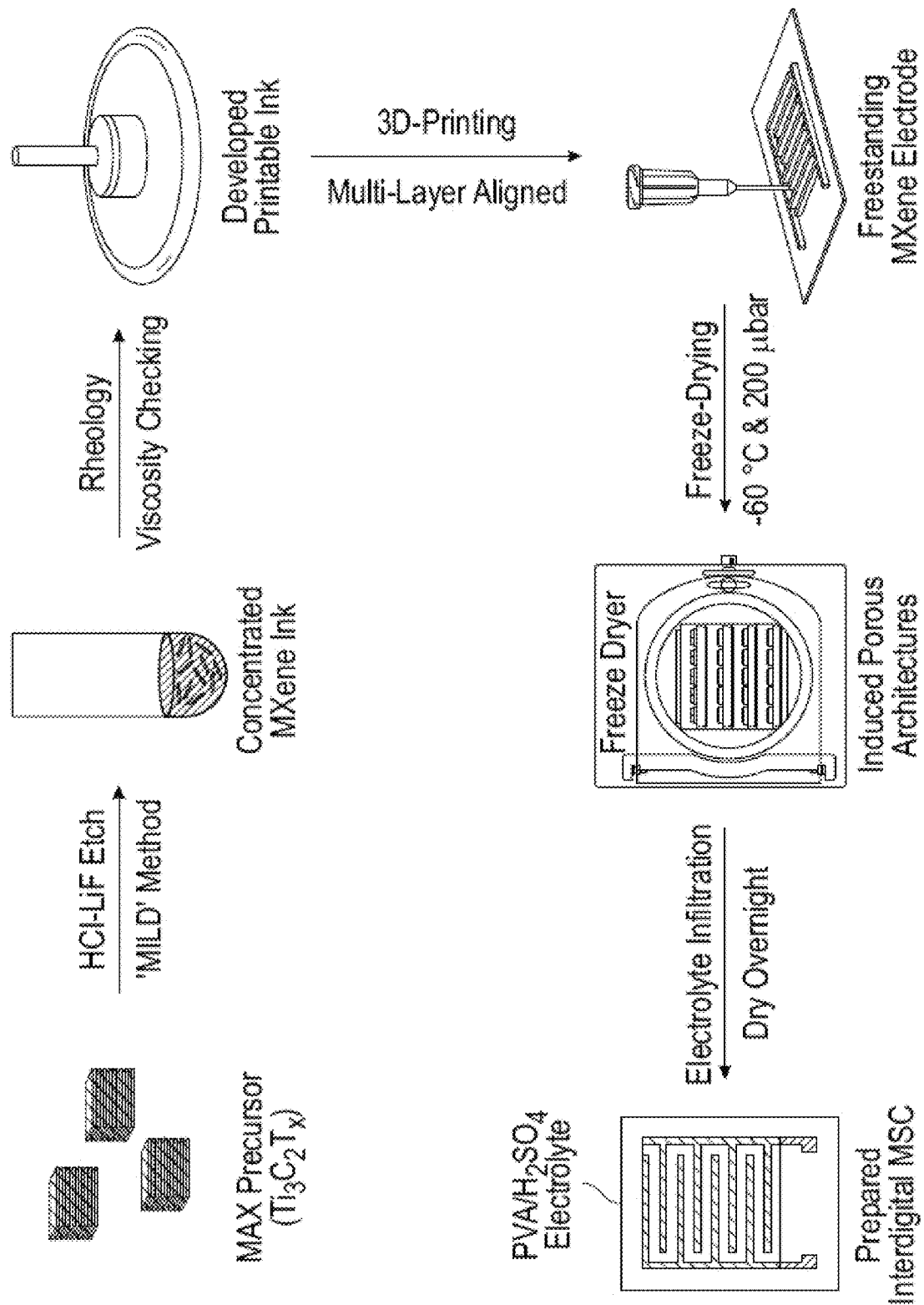
FIG. 6C is an example illustration of a manufacturing process for a 3D-printed micro-supercapacitor (MSC), in accordance with various embodiments of the disclosed technology.
Figure 7:
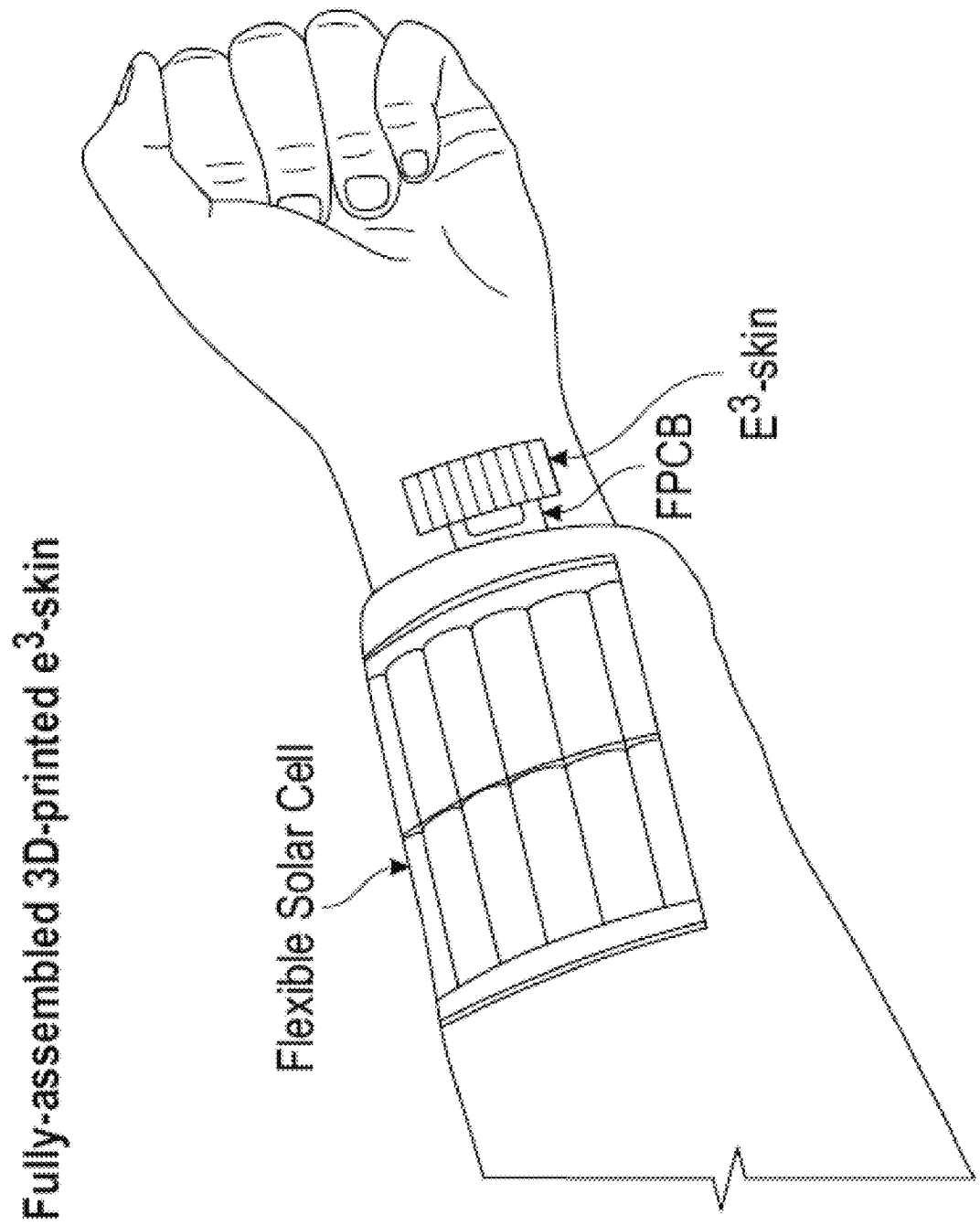
FIG. 7 is an example diagram of a wearable system with a flexible solar cell, in accordance with various embodiments of the disclosed technology.

FIG. 6A is an example illustration of a process to prepare concentrated MXene customized inks, in accordance with various embodiments of the disclosed technology as described herein. FIG. 6B is an example illustration of three pressure sensors with different surface architectures, in accordance with various embodiments of the disclosed technology as described herein. FIG. 6C is an example illustration of a manufacturing process for a 3D-printed microsupercapacitor (MSC), in accordance with various embodiments of the disclosed technology. FIG. 7 is an example diagram of a wearable system with a flexible solar cell, in accordance with various embodiments of the disclosed technology as described herein.

Figure 8:
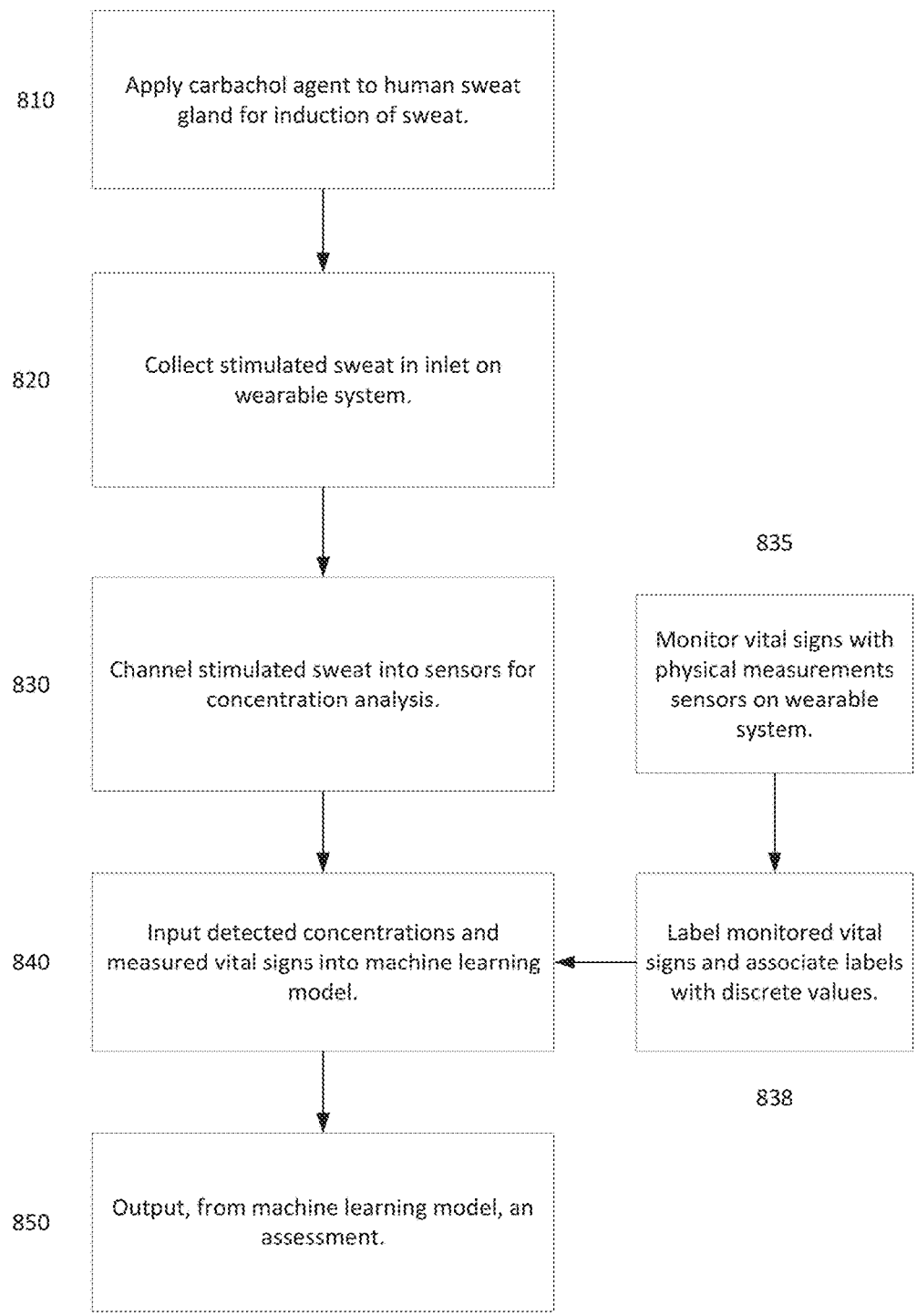
FIG. 8 is an example of a flow diagram showing a method for sweat induction and analysis, in accordance with various embodiments of the disclosed technology.

FIG. 8 is an example of a flow diagram showing a method for sweat induction and analysis, in accordance with various embodiments of the disclosed technology. First, a stimulating agent, e.g., carbochol, may be applied to a human sweat gland to induce a flow of sweat 810. The stimulating agent may be a carbagel, carbochol, carbochol hydrogel, or other agent that stimulates the flow of sweat. Second, the stimulated sweat is collected via an inlet on the wearable assessment system 820. The inlet may be located on the sweat microfluidics layer. Third, the sweat sample may be channeled from the inlet to the sensors, located on the 3D printed epidermal wearable microfluidic electronic skin (or $e^3$-skin), for concentration analysis 830. At a similar time, the wearable system may monitor vital signs with physical measurement sensors on the wearable system 835. The output of the physical measurement sensors may be labeled and assigned values based on the monitored vital signs 838. The concentrations detected by the sensors in step 830 and the values from the monitored vital signs in step 838 may be input into a machine learning model 840 (which, as discussed, may be trained on known data sets during supervised learning, and subsequently applied with unknown outputs). Finally, the output, from the machine learning model, is produced as an assessment 850, the assessment 850 may be discrete, e.g., it may provide a snapshot of a person's health status at a discrete moment in time, or it may be continuous, e.g., as used for continuous health surveillance and monitoring.

A wearable system, as described in reference to FIGS. 1-8, above, may measure concentrations of many different biomarkers in addition to electrolytes, metabolites, and/or vital signs. For example, a wearable assessment system may measure the concentrations of all or any of the nine essential amino acids. Amino acids are organic compounds that are present in the human body and in food sources. Concentrations of amino acids may vary depending on many factors including dietary intake, genetic predisposition, gut microbiota, environmental factors, lifestyle factors including sleep and exercise, and other factors. The concentrations of amino acids present in human bodily fluids, including sweat and blood, can provide important information about the health of an individual. For example, elevated levels of branched-chain amino acids (BCAAs) including for example, leucine (Leu), isoleucine (Ile), and valine (Val) may be correlated with certain health conditions including obesity, insulin resistance, diabetes, cardiovascular disease, and pancreatic cancer. Deficiencies in amino acids, including, for example, arginine and cysteine, may indicate immune suppression and/or reduced immune-cell activation In another embodiment, a wearable system may measure concentrations of amino acids in addition to other organic compounds, including vitamins and minerals. For example, imbalances with tryptophan (Trp), tyrosine (Tyr) and phenylalanine (Phe), which are needed to support neurotransmitters such as serotonin, dopamine, norepinephrine, and epinephrine, may indicate neurological and/or mental health conditions. Other metabolic indicators involving, for example, Leu, Phe, and vitamin D, may be linked with severity, vulnerability, and mortality related to viral infections including COVID-19. Other compounds, like glucose and uric acid may also be measured outside of the stress assessment context to determine risk of developing, and/or severity of, a particular health condition.

In another embodiment, amino acids, vitamins, and mineral concentrations may be measured to develop a personalized nutrition plan. After measurement of initial concentrations, a human patient may be advised to make dietary modifications to account for deficiencies and/or excesses of key amino acids, vitamins, and minerals. The human patients adherence to a nutritional plan and progress may be monitored continuously with the wearable assessment system.

As discussed throughout, health status detection and evaluation may be made based on concentrations of relevant electrolytes and metabolites. An object model for health status may be trained. For example, the object model may be trained with standard health status questionnaires. Then, machine learning methods may be used to optimize detection and evaluation of health status through electrolyte and metabolic analysis, using questionnaires as an object model. For example, a machine learning model may optimize which electrolytes and metabolites are most accurately correlated with health status determinations. A machine learning model may further optimize the level of detected metabolites that correlate more accurately to noteworthy health conditions. A machine learning model may be leveraged to determine at which point a human patient is experiencing too much physical distress to be effective in a given role.

In another embodiment a wearable system may detect and measure drug/alcohol compounds present in a sweat sample. Drug/alcohol compounds may be measured to assess compliance with a drug/alcohol treatment regimen. Drug compounds may also be measured to assess successful metabolization of a treatment drug. Drug compounds may also be measured to determine the risk and/or severity of drug toxicity due to a drug treatment regimen.

In another embodiment, the wearable system may measure the concentration of certain hormones. In another embodiment, the wearable system may measure the concentration of antibodies present in a human patient which may indicate an infection, the degree of immune response to a viral, bacterial, or fungal agent, an autoimmune disease, or another health condition.

A wearable system may employ various power sources. For example, in one embodiment, a wearable assessment system may be equipped with a lightweight battery. In another embodiment, the wearable assessment system may be wired to a smart device's power supply. In another embodiment, the wearable assessment system may leverage a biofluid powering system to power the device with the collected sweat flow itself. In another embodiment, the wearable assessment system may be powered with a small solar panel, as discussed in relation to FIG. 7. In another embodiment, the wearable assessment system may be powered by human motion.

The proposed SSE-based 3D-printing may provide an elegant solution for the development of sustainable wearable multimodal health monitoring devices that traditionally can only be prepared with a series of complex fabrication processes. The 3D-printed $e^3$-skin may feature multimodal sensing of various physicochemical biomarkers with untethered battery-free operation capabilities. Extrudable inks with suitable rheological performance based on different materials (e.g., nanomaterials, polymers, hydrogels, and other composites) may be custom-designed and optimized to achieve specific device functionality. Importantly, such SSE-based 3D-printing may enable efficient maskless patterning of both 2D and 3D architectures which can fulfill all or many fabrication requirements for an integrated wearable device. Furthermore, the present disclosure introduces a general phase elimination strategy to create highly porous microstructures critical for enhancing the devices' performance in practical applications.

The all-3D-printed $e^3$-skin may be capable of simultaneously monitoring glucose, alcohol, and pH in sweat along with heart rate and temperature, and may further be equipped with an iontophoretic module for localized on-demand sweat induction, a microfluidic channel for efficient sweat sampling, and an MSC as an energy storage module that can be interfaced with an energy harvesting device for battery-free sustainable operation. With the multimodal tracking capability, more comprehensive information of our body responses can be extracted and interpreted. The present disclosure may demonstrate its practical use for real-time health surveillance during regular daily activities. In addition, the information collected by the $e^3$-skin, and analyzed with machine learning algorithms, may be able to provide useful knowledge for practical personalized health assessment. For example, embodiments of the disclosed technology may be able to predict with improved accuracy the degree of behavioral impairments (i.e., reaction time and inhibitory control) of an individual after consumption of alcohol. Embodiments of the present disclosure including such wearables with multimodal sensing capabilities that can be prototyped using the presented simple and low-cost 3D-printing technology will find its use for both regular remote health surveillance and clinical applications.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A wearable system, comprising:
    a 3D-printed epidermal wearable microfluidic electronic skin configured to adhere to and conform with the contours of human skin;
    an array of 3D-printed sensors integrated within the 3D-printed epidermal wearable microfluidic electronic skin;
    at least two 3D-printed electrodes integrated within the 3D-printed epidermal wearable microfluidic electronic skin and configured to localized sweat induction;
    a 3D-printed microfluidics component comprising multiple inlets configured to contact the human skin and collect a sweat sample from the human skin; and
    a 3D-printed processor comprising non-transitory computer readable instructions to process data collected from the array of 3D-printed sensors.

2. The wearable system of claim 1, wherein the epidermal wearable microfluidic electronic skin, at least one sensor of the array of sensors, at least one electrode of the at least two electrodes, and the microfluidics component are constructed with semi-solid extrusion (SSE)-based 3D-printing technology.

3. The wearable system of claim 1, wherein the epidermal wearable microfluidic electronic skin, at least one sensor of the array of sensors, at least one electrode of the at least two electrodes, and the microfluidics component are constructed using direct ink writing (DIW).

4. The wearable system of claim 1, wherein the epidermal wearable microfluidic electronic skin, at least one sensor of the array of sensors, at least one electrode of the at least two electrodes, and the microfluidics component are constructed using selective phase elimination.

5. The wearable system of claim 1, wherein at least one 3D-printed sensor in the array of 3D-printed sensors is an electrochemical sweat biosensor.

6. The wearable system of claim 1, wherein at least one 3D-printed sensor in the array of 3D-printed sensors is a biophysical sensor.

7. The wearable system of claim 1, wherein the at least two electrodes are hydrogel-coated iontophoresis electrodes.

8. The wearable system of claim 1, further comprising a micro-supercapacitor (MSC) configured to store energy.

9. The wearable system of claim 8, further comprising an energy harvesting device electrically coupled to the micro-supercapacitor (MSC).

10. The wearable system of claim 1, wherein the epidermal wearable microfluidic electronic skin, at least one sensor of the array of sensors, at least one electrode of the at least two electrodes, and the microfluidics component are each printed with a customizable ink.

11. A method of manufacturing an electronic skin, comprising:
    3D-printing a microfluidics layer using a first customizable ink, wherein the microfluidics layer further comprises a 3D-printed SBS inlet layer, a 3D-printed SBS channel layer, and a 3D-printed carbachol-loaded hydrogel (carbagel) layer;
    3D-printing a biosensor using a second customizable ink, wherein the biosensor further comprises a 3D-printed SBS substrate, a 3D-printed electrode, and a 3D-printed sensing layer;
    3D-printing a micro-supercapacitor layer using a third customizable ink, wherein the micro-supercapacitor layer further comprises a 3D-printed substrate, a 3D-printed MXene electrode, and a 3D-printed gel electrolyte; and
    combining the 3D-printed microfluidics layer, the 3D-printed biosensor, and 3D-printed micro-supercapacitor.

12. The method of claim 11, wherein 3D-printing the biosensor further comprises a 3D-printed CNT-SBS-PANI.

13. The method of claim 11, wherein the 3D-printed electrode is any one of: a 3D-printed MXene electrode, a 3D-printed Ag electrode, and a 3D-printed CNT-SBS electrode.

14. The method of claim 11, wherein the first, second, and third customizable inks are formulated with at least one compound from a list consisting of: MXene, CNT-PDMS, Ag, CNT-SBS, CNT-SBS-PANI, SBS, MX-PB, carbachol-loaded hydrogel (carbagel), PVA-$H_2SO_4$, $GO_x$, PU, PEG, BSA, chitosan, carbachol, PVA, UA, D-glucose, NaCl, DMF, KCl, PBS, LiF, $Fe_4[Fe(CN)_6]_3$, $FeCl_3$, THF, $K_3Fe(CN)_6$, HCl, CNT, CB, PDMS, and $AO_x$.

15. The method of claim 11, further comprising semi-solid extrusion (SSE)-based 3D-printing the microfluidics layer, the biosensor, and the micro-supercapacitor.

16. The method of claim 11, further comprising direct ink writing (DIW) the microfluidics layer, the biosensor, and the micro-supercapacitor.

17. The method of claim 11, further comprising selective phase eliminating the microfluidics layer, the biosensor, and the micro-supercapacitor.

18. An electronic skin system for human health status surveillance, comprising:
- a 3D-printed epidermal wearable microfluidic electronic skin configured to adhere to and conform with the contours of human skin, wherein the 3D-printed epidermal wearable microfluidic electronic skin comprises a first customizable ink;
- an array of 3D-printed sensors integrated within the 3D-printed epidermal wearable microfluidic electronic skin, wherein each of the 3D-printed sensors comprises a second customizable ink;
- at least two 3D-printed electrodes integrated within the 3D-printed epidermal wearable microfluidic electronic skin and configured for localized sweat induction, wherein each of the at least two 3D-printed electrodes comprises a third customizable ink;
- a 3D-printed microfluidics component comprising multiple inlets configured to contact the human skin and collect a sweat sample from the human skin, wherein the 3D-printed microfluidics component comprises a fourth customizable ink; and
- a 3D-printed processor comprising non-transitory computer readable instructions to process data collected from the array of 3D-printed sensors, wherein the 3D-printed processor comprises a fifth customizable ink.

19. The system of claim 18, wherein each of the first, second, third, fourth, and fifth customizable inks comprise at least one compound from a list consisting of: MXene, CNT-PDMS, Ag, CNT-SBS, CNT-SBS-PANI, SBS, MX-PB, carbagel, PVA-$H_2SO_4$, $GO_x$, PU, PEG, BSA, chitosan, carbachol, PVA, UA, D-glucose, NaCl, DMF, KCl, PBS, LiF, $Fe_4[Fe(CN)_6]_3$, $FeCl_3$, THF, $K_3Fe(CN)_6$, HCl, CNT, CB, PDMS, and $AO_x$.

20. The system of claim 19, wherein the first, second, third, fourth, and fifth customizable inks are different from each other.

* * * * *